US012703235B2

(12) United States Patent
Zhang et al.

(10) Patent No.: US 12,703,235 B2
(45) **Date of Patent: *Aug. 11, 2026**

(54) ELECTRIC VEHICLE AND QUICK SWAPPING ASSEMBLY

(71) Applicants: AULTON NEW ENERGY AUTOMOBILE TECHNOLOGY CO., LTD., Guangzhou (CN); SHANGHAI DIANBA NEW ENERGY TECHNOLOGY CO., LTD., Shanghai (CN)

(72) Inventors: Jianping Zhang, Shanghai (CN); Danliang Qiu, Shanghai (CN); Meng Liu, Shanghai (CN); Xinrui Yu, Shanghai (CN)

(73) Assignees: AULTON NEW ENERGY AUTOMOBILE TECHNOLOGY CO., LTD., Guangzhou (CN); SHANGHAI DIANBA NEW ENERGY TECHNOLOGY CO., LTD., Shanghai (CN)

( * ) Notice: Subject to any disclaimer, the term of this patent is extended or adjusted under 35 U.S.C. 154(b) by 302 days.

This patent is subject to a terminal disclaimer.

(21) Appl. No.: 18/574,040

(22) PCT Filed: Nov. 29, 2022

(86) PCT No.: PCT/CN2022/135121

§ 371 (c)(1),
(2) Date: Dec. 24, 2023

(87) PCT Pub. No.: WO2023/098682

PCT Pub. Date: Jun. 8, 2023

(65) Prior Publication Data

US 2024/0294091 A1 Sep. 5, 2024

(30) Foreign Application Priority Data

Nov. 30, 2021 (CN) ......................... 202111444383.8
Dec. 26, 2021 (CN) ......................... 202111606763.7
(Continued)

(51) Int. Cl.
*B60K 1/04* (2019.01)
*B60L 50/64* (2019.01)
(Continued)

(52) U.S. Cl.
CPC ................ *B60K 1/04* (2013.01); *B60L 50/64* (2019.02); *B60L 53/80* (2019.02); *H01M 10/46* (2013.01);
(Continued)

(58) Field of Classification Search
CPC .............. B60K 1/04; B60K 2001/0405; B60K 2001/0438; B60K 2001/0455;
(Continued)

(56) References Cited

U.S. PATENT DOCUMENTS 11,043,714 B2 * 6/2021 Sloan ....................... B60K 1/04

FOREIGN PATENT DOCUMENTS

CN 104112832 A 10/2014
CN 205255985 U 5/2016
(Continued)

OTHER PUBLICATIONS

Feb. 20, 2023 International Search Report issued in International Patent Application No. PCT/CN2022/135121.
(Continued)

*Primary Examiner* — Edwin A Young

(57) ABSTRACT

The invention discloses an electric vehicle, and the electric vehicle comprises vehicle beams and a battery unit, and the battery unit comprises a plurality of battery packs arranged
(Continued)

side by side along a width direction of the vehicle beams; and a locking unit is arranged on the vehicle beams, and a connecting unit is arranged between the two adjacent battery packs corresponding to the vehicle beams, and the connecting unit is matched with the locking unit to lock and connect the battery unit to the vehicle beams. In this invention, the battery unit is provided with a plurality of battery packs, which is capable for supplying power to a heavy electric vehicle. The connection between the battery unit and the vehicle beams can also be located in the space between the battery packs to improve the connection stability.

19 Claims, 13 Drawing Sheets

(30) Foreign Application Priority Data

Dec. 26, 2021 (CN) ......................... 202111606781.5
Dec. 31, 2021 (CN) ......................... 202111673713.0

(51) Int. Cl.

| | |
|---|---|
| ***B60L 53/80*** | (2019.01) |
| ***H01M 10/46*** | (2006.01) |
| ***H01M 50/204*** | (2021.01) |
| ***H01M 50/209*** | (2021.01) |
| ***H01M 50/244*** | (2021.01) |
| ***H01M 50/249*** | (2021.01) |
| ***H01M 50/262*** | (2021.01) |
| ***H01M 50/264*** | (2021.01) |
| ***H01M 50/271*** | (2021.01) |
| ***H01M 50/289*** | (2021.01) |
| *H01M 50/242* | (2021.01) |

(52) U.S. Cl.

CPC ....... *H01M 50/204* (2021.01); *H01M 50/209* (2021.01); *H01M 50/244* (2021.01); *H01M 50/249* (2021.01); *H01M 50/262* (2021.01); *H01M 50/264* (2021.01); *H01M 50/271* (2021.01); *H01M 50/289* (2021.01); *B60K 2001/0405* (2013.01); *B60K 2001/0438* (2013.01); *B60K 2001/0455* (2013.01); *B60K 2001/0472* (2013.01); *H01M 50/242* (2021.01); *H01M 2220/20* (2013.01)

(58) Field of Classification Search

CPC . B60K 2001/0472; B60L 50/64; B60L 53/80; H01M 50/249; H01M 50/262; H01M 50/289; H01M 50/209; H01M 50/264; H01M 50/244; H01M 50/204; H01M 50/271; H01M 50/242; H01M 10/46; H01M 2220/20

See application file for complete search history.

(56) References Cited

FOREIGN PATENT DOCUMENTS

| | | | | | |
|---|---|---|---|---|---|
| CN | 106864239 | A | 6/2017 | | |
| CN | 209045643 | U | 6/2019 | | |
| CN | 112038517 | A | 12/2020 | | |
| CN | 112123320 | A | 12/2020 | | |
| CN | 213026311 | U | 4/2021 | | |
| CN | 217944959 | U | 12/2022 | | |
| DE | 102017125812 | A1 | 5/2019 | | |
| DE | 102019204819 | A1 | 10/2020 | | |
| JP | H11115504 | A | 4/1999 | | |
| KR | 20170004028 | U | 11/2017 | | |
| WO | WO-2019129289 | A1 * | 7/2019 | .......... | H01M 50/262 |

OTHER PUBLICATIONS

Feb. 20, 2023 Written Opinion of the International Searching Authority issued in International Patent Application No. PCT/CN2022/135121.

May 12, 2025 First Search Report issued in Chinese Patent Application No. 202111673713.0.

May 14, 2025 First Office Action issued in Chinese Patent Application No. 202111673713.0.

* cited by examiner

ELECTRIC VEHICLE AND QUICK SWAPPING ASSEMBLY

The present application is a National Stage of International Application No. PCT/CN2022/135121, filed on Nov. 29, 2022, which claims the priority of Chinese patent application CN202111606763.7 filed on Dec. 26, 2021, the priority of Chinese patent application CN202111606781.5 filed on Dec. 26, 2021, the priority of Chinese patent application CN202111444383.8 filed on Nov. 30, 2021, the priority of Chinese patent application CN202111673713.0 filed on Dec. 31, 2021. The contents of the Chinese patent applications are incorporated herein by reference in their entireties.

TECHNICAL FIELD

The invention relates to an electric vehicle, in particular to an electric vehicle with a quick-swapping battery unit and a quick-swapping assembly.

BACKGROUND

For heavy electric vehicles, such as convoy trucks, they require configuring more battery packs to power the electric vehicles. In the prior art, the quick swapping operation for battery packs of commercial electric vehicles is usually carried out by a quick-swapping battery pack and a quick-swapping bracket arranged on the vehicle, but in the prior art, the commercial electric vehicle is usually provided with only one battery pack, then it can meet the power supply requirements.

Besides, commercial electric vehicles are usually used to carry passengers, and their own weight is less than that of convoy trucks. Therefore, the battery swapping station of the commercial electric vehicle can be arranged on the battery swapping platform above the ground or implement quick swapping for the battery pack at the bottom of the commercial electric vehicle by digging a pit in the ground. However, for heavy electric vehicles, when arranging a battery swapping platform above the ground, the quick swapping of battery packs requires higher civil engineering cost to build a platform with strong structure; while digging a pit in the ground will cause a risk that the structure may collapse after heavy electric vehicles driving in.

In the electric vehicle of the prior art, such as a heavy truck, the battery pack is placed above the vehicle beams, when swapping battery, the battery is transferred and swapped by a top lifter, and in this way, the center of the battery pack is higher in relative to the vehicle beams, which has potential safety hazards, while in the way that the battery pack is mounted at the bottom of the vehicle, it is generally necessary to lift the electric vehicle or dig a pit in the ground for the battery swapping device entering and exiting the bottom of the vehicle to uninstall and install the battery pack, which causes relatively high cost and difficulty in building the station, and relatively high requirement for the site to build the station and low battery swapping efficiency, especially for the heavy truck, the own weight of which is tens of tons, therefore, the existing lifting equipment is difficult to meet the demand of lifting the vehicle body and requires a larger floor area when digging a pit in the ground, and when the vehicle passes by the area near the pit, it is easy to cause collapse.

CONTENT OF THE PRESENT INVENTION

The technical problem to be solved by the invention is to overcome the defects in the prior art that vehicle body needs to be lifted or dig a pit in the ground when carrying out battery swapping from the chassis of the electric vehicle, which leads to great difficulty, high cost, long period in building a station, and exists potential safety hazards, thus the invention provides an electric vehicle and a quick swapping assembly.

The invention solves the technical problem by the following technical solutions:

An electric vehicle, the electric vehicle comprises vehicle beams and a battery unit, and the battery unit comprises a plurality of battery packs arranged side by side along a width direction of the vehicle beams;

- a locking unit is arranged on the vehicle beams, and a connecting unit is arranged between the two adjacent battery packs corresponding to the vehicle beams, and the connecting unit is matched with the locking unit to lock and connect the battery unit to the vehicle beams.

In this solution, the battery unit is provided with a plurality of battery packs, which is capable for supplying power to a heavy electric vehicle; and a plurality of the battery packs of the battery unit are arranged side by side along the width direction of the vehicle beams, so that the battery packs can be arranged as a flat spread style, then the overall height of the battery unit is reduced; and by arranging a connecting unit between the battery packs, and connecting with the locking unit, thus the whole battery unit can be connected to the vehicle beams of the electric vehicle, then when carrying out battery swapping for heavy electric vehicles, the whole battery unit can be swapped, so as to meet the quick-swapping requirement for the heavy electric vehicles. It also can make the connection between the battery unit and the vehicle beams to be located in the space between the battery packs, so as to improve the stability of the connection. Besides, by arranging the locking unit on the vehicle beams, the battery unit can be swapped at the bottom of the vehicle so as to reserve sufficient space for the battery swapping of the battery swapping device, thus avoid lifting the vehicle or digging a pit in the ground for the battery swapping device entering and exiting the bottom of the vehicle.

Preferably, the locking unit comprises a locking containing cavity for the connecting unit entering in order to lock and fix the battery unit, and the locking containing cavity is located under the vehicle beams.

In this solution, the locking containing cavity is located under the vehicle beams, then when the battery unit is locked in the locking containing cavity, the locking position of the battery unit is also located under the vehicle beams. When the battery unit is swapped or mounted, the battery swapping device only needs to move the battery unit downward for a relatively short distance, it can avoid the vehicle beam and the locking unit, so as to enter and exit the bottom of the vehicle beams along the horizontal direction, and reserve sufficient space for the battery swapping device carrying the battery to enter and exit the bottom of the vehicle beams, thereby avoiding that parts on the vehicle being interfered with the battery swapping device entering and exiting the bottom of the vehicle.

Preferably, the locking unit comprises a locking base, and the locking containing cavity is arranged in the locking base, and the locking base is connected to the vehicle beams.

In this solution, the locking is performed by the locking base, which facilitates structural modification of the locking base to adapt to the structure of the connecting unit, avoids modifying the structure of the main beam of the vehicle body, and improves the stability and reliability of locking.

Preferably, the locking unit comprises a mounting base, and the locking base is connected to the bottom of the vehicle beams by means of the mounting base.

In this solution, the locking base can be mounted at the bottom of the vehicle beams by means of the mounting base, so that the mounting is flexible, and it can adapt to different structures of the vehicle beams and the requirements of different installation positions under the condition without affecting the connection structure with the connecting unit.

Preferably, the locking base is connected to the vehicle beam by means of a quick-swapping bracket, and the quick-swapping bracket is connected to the side surface of the vehicle beams.

In this solution, the locking base can be integrally mounted on the vehicle beam by means of the quick-swapping bracket, which facilitates integrating the quick-swapping mechanism such as a plurality of the locking bases and the electrical connectors onto the quick-swapping bracket, to realize the overall installation and uninstallation of the quick-swapping mechanism, and it can simplify the installation steps and process, thereby improving the installation efficiency.

Preferably, the connecting unit comprises a locking shaft and a shaft base, and the locking shaft is mounted between the two adjacent battery packs by means of the shaft base.

In this solution, the installation of the locking shaft can be realized by means of the shaft base, and the locking unit can lock the locking shaft so as to connect the battery pack to the vehicle beams.

Preferably, the shaft base comprises two opposite arranged side plates, and both ends of the locking shaft are respectively connected to the side plates, and the locking shaft is hooked onto the locking unit.

In this solution, both ends of the locking shaft are connected to the side plates, then when the locking shaft is hooked and connected to the locking unit, both ends of the locking shaft can bear force, which improves the bearing effect of the locking shaft to the battery unit, and makes the connection between the battery unit and the vehicle beam further firm and stable.

Preferably, the locking base comprises a locking groove, and the locking groove penetrates through along the thickness direction of the locking base, and the locking containing cavity is positioned in the locking groove, and the locking groove is used to hook the locking shaft.

In this solution, the locking containing cavity is positioned in the through locking groove, so that it can contain the locking shaft with both ends being supported, and makes both ends of the locking shaft to be able to bear force, which improves the supporting strength of the locking base to the locking shaft.

Preferably, the locking base comprises an open groove, and the open groove is communicated with the locking groove, and the open groove is a penetrate groove, and the open groove is used for the locking shaft entering into the locking groove and being locked in the locking containing cavity.

In this solution, by means of the open groove and the locking groove communicating with the open groove, the locking shaft can enter into the locking groove from the open groove and finally be locked in the locking containing cavity, thus the locking steps are simple, and the locking efficiency and success rate can be improved.

Preferably, the distance between the two side plates is greater than the thickness of the locking base.

In this solution, by the above structure, when the locking unit locks the locking shaft, in the process that the locking shaft enters into the locking groove in the locking base, the side plate can be prevented from interfering with the locking base.

Preferably, the battery unit further comprises a top plate arranged between the two side plates, and the top plate is provided with a first through hole for the locking base passing through, so that the locking shaft reaches the inside of the locking containing cavity of the locking base.

In this solution, by arranging the top plate between the two side plates, the connection strength of the two side plates is improved, and avoid the side plates being deformed or damaged, then the structural strength of the whole connecting unit is improved; and by arranging the first through hole, the locking base and the locking shaft can be guided to be aligned with and match each other.

Preferably, the first through hole extends along the length direction of the vehicle beams, and the length of the first through hole is greater than the sum of the locking base's length and the horizontal moving distance of the locking shaft in the locking groove.

In this solution, it can avoid the moving of the locking shaft along the horizontal direction in the locking groove being interfered.

Preferably, when the locking shaft is located in the lock containing cavity, the distance between the center of the locking shaft and the bottom surface of the first through hole is smaller than the distance between the center of the locking shaft and the bottom of the vehicle beams.

In this solution, it can avoid the moving of the locking shaft along the vertical direction in the locking base being interfered.

Preferably, the locking unit further comprises a locking tongue, and the locking tongue is rotatably connected to the locking base, in order to open or close the open groove.

In this solution, the locking shaft can be limited in the locking base by means of the locking tongue, to realize the stability of the locking unit locking the locking shaft.

Preferably, the locking unit comprises at least two locking bases, and each of the locking base is rotatably connected to the locking tongue, and the locking unit further comprises a lock connecting rod, and the lock connecting rod is rotatably connected to a plurality of the locking tongues.

In this solution, a plurality of locking tongues can be unlocked by means of the lock connecting rod, which improves the unlocking efficiency, and is able to avoid the unlocking failure due to the inconsistent unlocking time caused by a plurality of the locking tongues being unlocked respectively.

Preferably, the locking unit comprises a reset piece, and one end of the reset piece is connected to the lock connecting rod, and the other end of the reset piece is connected to a quick-swapping bracket or the vehicle beam.

In this solution, the lock connecting rod can be automatically reset by the resetting rod, and automatic locking can be realized when locking.

Preferably, the locking tongue is provided with an unlocking part extending to the outside of the locking base.

In this solution, the locking tongue itself can be provided with an unlocking part, so that a single locking tongue can be unlocked by the action of an external device applying force onto the unlocking part. In the specific implementation, a single locking tongue can be provided with the unlocking part to unlock the locking tongue, so that the locking tongue with the unlocking part and the locking base can be used as the secondary locking components of the locking unit, thus when the locking component with the lock connecting rod fails, the locking shaft can still be locked, which avoids locking failure and improves the locking ability of the locking unit to the connecting unit.

Preferably, the battery unit further comprises an unlocking rod, and the unlocking rod is arranged opposite to the unlocking part or the lock connecting rod, and is used to push the unlocking part or the lock connecting rod to rotate so that the locking tongue opens or closes the open groove.

In this solution, the unlocking part or the lock connecting rod can be operated by the unlocking rod to open or close the open groove, and when the unlocking rod acts on the unlocking part or the lock connecting rod, the locking tongue opens the open groove then the connecting unit can be moved out of the locking unit.

Preferably, the quick-swapping bracket for connecting the locking base comprises a bottom surface, and the bottom surface is provided with a second through hole for the unlocking rod passing through, in order to act on the lock connecting rod or the unlocking part.

In this solution, on one hand, the bottom surface of the quick-swapping bracket can improve the structural strength of the quick-swapping bracket, and on the other hand, it can also be used as the foundation for mounting the locking base, and improve the connection strength between the locking base and the quick-swapping bracket, and arranging a second through hole on the bottom surface is to facilitate the unlocking rod to pass through and implement the unlocking operation.

Preferably, the length of the second through hole is greater than the horizontal moving distance of the locking shaft in the locking groove.

In this solution, by the above-mentioned structure, it can avoid interfering with the horizontal moving of the locking shaft of the battery unit in the locking unit during unlocking, so that the locking shaft in the locking groove moves to the position corresponding to the open groove.

Preferably, a plurality of the locking shafts and a plurality of the locking bases are all arranged along the length direction of the vehicle beams.

In this solution, by the above-mentioned structure, the supporting point of the battery pack is corresponding to the vehicle beams, so as to improve the supporting strength of the vehicle beams to the battery pack.

Preferably, the connecting unit is connected to the vehicle beams by means of a connecting bracket, and the connecting bracket is provided with a connecting groove penetrating through along the width direction of the vehicle beams, to contain, lock and fix the connecting unit.

In this solution, a through connecting groove can be directly arranged on the connecting bracket and the locking shaft can be contained, i.e. the connecting bracket performs the function of connecting the vehicle beam, meanwhile it also can directly lock and connect the battery unit, thus the structure is simple and the manufacturing cost is low.

Preferably, the upper surface of the connecting unit is not higher than the upper surface of the battery pack.

In this solution, the upper surface of the connecting unit is not higher than the upper surface of the battery pack, which can further reduce the overall height of the battery pack; meanwhile, the partial height of the locking unit can be contained, so that the height of the battery pack away from the ground can be further increased, then facilitates the chassis-type battery swapping device entering and exiting the bottom of the vehicle beams to dismount and mount the battery, thus it can reserve more space for the battery swapping device entering under the vehicle beams to swap battery. Besides, it can be understood that the upper surface of the connecting unit may also be slightly higher than the upper surface of the battery pack, and the connection between the connecting unit and the locking unit may be wholly or partly under the upper surface of the battery pack.

Preferably, the locking unit comprises a second locking containing cavity for the connecting unit entering so as to lock and fix the battery unit, and the second locking containing cavity is located on one side of the side surface of the vehicle beams.

In this solution, the second locking containing cavity can be located on one side of the vehicle beams, and when the connecting unit is connected to the second locking containing cavity, the battery pack can be located on one side of the vehicle beam, thereby increasing the distance between the lower surface of the battery pack and the ground, leaving more space for the battery swapping device to enter under the vehicle and carry out battery swapping operation.

Preferably, the locking unit comprises a second locking base, and the second locking containing cavity is arranged in the second locking base, and the second locking base is connected to the vehicle beam.

In this solution, locking is performed by the second locking base, which facilitates modifying the structure of the second locking base to adapt to the structure of the connecting unit, avoids modifying the structure of the main beam of the vehicle body, and can improve the stability and reliability of the locking.

Preferably, the locking unit comprises a second mounting base, and the second locking base is connected to the side surface of the vehicle beam by means of the second mounting base.

In this solution, the second locking base can be mounted on the side surface of the vehicle beam by means of the second mounting base, so that the installation is flexible and can adapt to the requirements with the different structures of the vehicle beams and the different mounting positions under the condition without affecting the connecting structure with the connecting unit.

Preferably, the second locking base is connected to the vehicle beam by means of a second quick-swapping bracket, and the second quick-swapping bracket is connected to the side surface of the vehicle beam.

In this solution, the second locking base can be integrally mounted on the vehicle beam by means of the second quick-swapping bracket, which facilitates integrating quick-swapping mechanisms such as a plurality of second locking bases and electrical connectors into the quick-swapping bracket, then realizes the integral installation and uninstallation of the quick-swapping mechanism, and simplifies the installation steps and processes, and improves the installation efficiency.

Preferably, the connecting unit comprises a second locking shaft and a second shaft base, and one end of the second locking shaft is connected to the side surface of the second shaft base and extends from the side surface of the second shaft base along the direction toward the vehicle beam; and the vehicle beam is provided with a second locking base, comprising a second locking groove, and the second locking groove is used for containing the second locking shaft.

Preferably, a plurality of the second locking shafts and a plurality of the second locking bases are all arranged along the length direction of the vehicle beam.

In this solution, by the above-mentioned structure, the supporting point of the battery pack is corresponding to the vehicle beam, which improves the supporting strength of the vehicle beam to the battery pack.

Preferably, the connecting unit comprises at least one of a thread connecting piece and a T-shaped hooking piece, and the thread connecting piece is used for connecting the battery unit to the vehicle beam in a thread way, and the T-shaped hooking piece is used for rotationally clamping the battery unit to the vehicle beam.

Preferably, the battery unit comprises a first electrical connector and a battery cavity for containing battery pack, and the connecting unit is arranged between the two adjacent battery cavities, and a through hole is arranged between the two adjacent battery cavities; and the first electrical connector is arranged on the outer side surface of any one of the battery cavities.

In this solution, the battery packs are arranged on the battery cavity and connected in the battery cavity by means of wires, to form an output end with one the first electrical connector; and when carrying out battery swapping to the battery unit, the electrical connection can be realized by inserting and aligning with one the first electrical connector.

Preferably, the battery unit further comprises a housing and a cover, and a plurality of separators are arranged at intervals in the housing, and the battery cavity is formed between the separators; and the cover is arranged at the cavity opening of each battery cavity.

In this solution, by the above-mentioned structure, a plurality of battery packs can be formed as a whole.

Preferably, the vehicle further comprises a second electrical connector, and the second electrical connector is arranged along the width direction of the vehicle beam, and the second electrical connector is used to be connected to the first electrical connector, so that the battery unit supplies power for the vehicle.

In this solution, by the above-mentioned structure, it facilitates the docking between the first electrical connector and the second electrical connector to form an electrical connection when dismounting and mounting the battery pack.

Preferably, the quick-swapping bracket for connecting the locking unit comprises a longitudinal bracket and a transverse bracket, and the longitudinal bracket is connected to the vehicle beam, and the transverse bracket is connected between the longitudinal brackets, and the transverse bracket is provided with the second electrical connector.

In this solution, the quick-swapping bracket with the above-mentioned structure can entirely mount the locking unit and the electrical connector on the vehicle beam at the same time when it is mounted on the vehicle beam, thus repeating the alignment debugging due to each component being mounted separately are avoided, then the installation efficiency can also be improved.

Preferably, the transverse bracket is located under the vehicle beams, and the longitudinal bracket is connected to the side surface of the vehicle beams.

In this solution, the transverse bracket is located under the vehicle beams, which can avoid interference of the vehicle beam; and the longitudinal bracket is connected to the side surface of the vehicle beams, which can increase the connection area and improve the stability of the connection by utilizing the stiffness of the vehicle beam.

Preferably, the transverse bracket covers at least a partial area of the end of the battery unit.

In this solution, support can be provided for the connection between electrical connectors during docking.

Preferably, the battery unit comprises a side battery pack, and the battery pack is arranged outside the vehicle beam.

In this solution, interference with the internal structure of the vehicle beam can be avoided.

Preferably, the battery unit further comprises a central battery pack, and the central battery pack is arranged between the two side battery packs and located under the vehicle beam.

In this solution, arranging the central battery pack can improve the power supply capability or reduce the thickness of the battery unit by arranging the central battery pack in the case of providing the same power supply capability. Besides, the central battery pack is arranged under the vehicle beam, which can avoid interference with components between the two vehicle beams.

Preferably, the side battery pack is provided with an avoidance opening for avoiding the transmission shaft of the electric vehicle.

A quick-swapping assembly, the quick-swapping assembly is applied to the above-mentioned electric vehicle;

the quick-swapping assembly comprises a locking unit and a battery unit, and the locking unit is used for connecting to the vehicle beam, and the battery unit comprises a plurality of battery packs, and a connecting unit is arranged between the two adjacent battery packs corresponding to the vehicle beam, and the connecting unit is matched with the locking unit.

The positive and progressive effects of the invention are in that: the battery unit is provided with a plurality of battery packs, which is capable for supplying power to a heavy electric vehicle; and a plurality of the battery packs of the battery unit are arranged side by side along the width direction of the vehicle beam, so that the battery packs can be arranged as a flat spread way thus the overall height of the battery unit is reduced; and by arranging a connecting unit between the battery packs, and connecting with the locking unit, the whole battery unit can be connected to the vehicle beam of the electric vehicle, then when carrying out battery swapping for heavy electric vehicles, the whole battery unit can be swapped in order to meet the quick-swapping requirement of the heavy electric vehicles, so as to reserve sufficient space for the battery swapping of the battery swapping device, thus avoid the case of lifting the vehicle or digging a pit in the ground.

Figure 1:
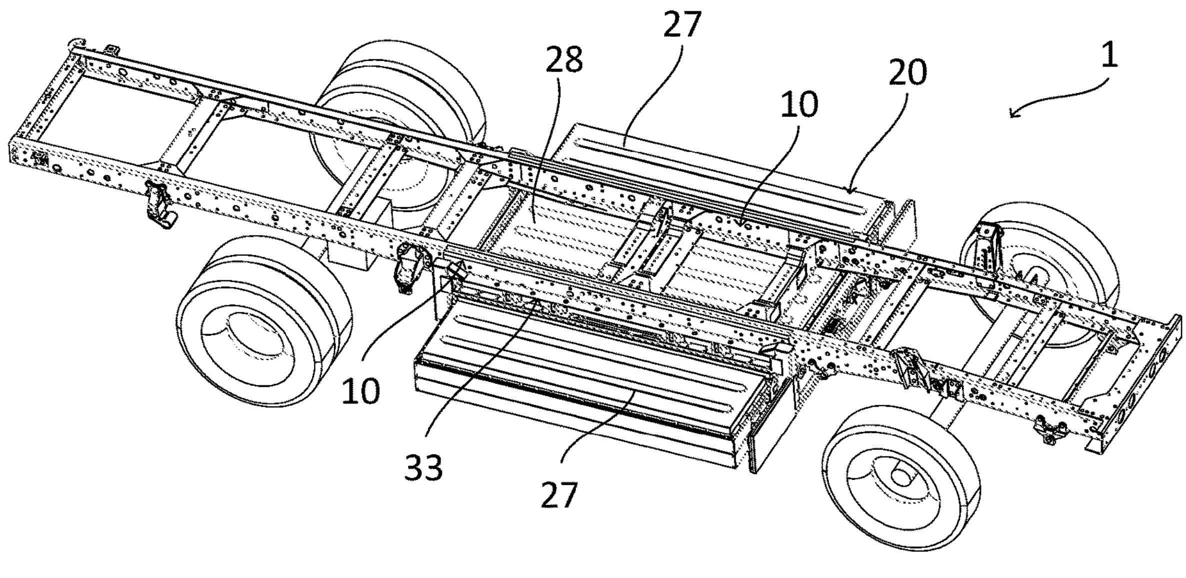
FIG. 1 is a schematic diagram of the structure of an electric vehicle provided by an embodiment of the present invention.

REFERENCE NUMERALS electric vehicle 1; vehicle beam 10; battery unit 20; first electrical connector 21; battery cavity 22; through hole 221; housing 23; cover 24; separator 25; second electrical connector 26; side battery pack 27; central battery pack 28; locking unit 30; locking containing cavity 31; locking base 32; locking groove 321; open groove 322; quick-swapping bracket 33; longitudinal bracket 331; side surface 3311; bottom surface 3312; top surface 3313; second through hole 3314; supporting column 3315; transverse bracket 332; connecting column 333; baffle 334; locking tongue 34; bulged part 341; lock connecting rod 35; reset piece 36; unlocking part 37; supporting base 38; connecting unit 40; locking shaft 41; shaft base 42; side plate 421; top plate 422; first through hole 423; shaft column 424; unlocking rod 43; connecting bracket 50; second locking containing cavity 60; second locking base 61; second quick-swapping bracket 62; second locking shaft 63; second shaft base 64; mounting base 70; battery swapping device 2; locking base 801; first opening 802; hooking part 803; first thread part 804; hooking rod 903; second thread part 904; second opening 905; locking piece 906; mounting housing 907

DETAILED DESCRIPTION OF THE PREFERRED EMBODIMENT

The following embodiments further illustrate the present disclosure, but the present disclosure is not limited by the following embodiments thereto.

An Embodiment of the present invention provides an electric vehicle 1, as shown in FIG. 1, the electric vehicle 1 comprises vehicle beams 10 and a battery unit 20, and the battery unit 20 comprises a plurality of battery packs arranged side by side along the width direction of the vehicle beams 10; and a locking unit 30 is arranged on the vehicle beams 10, and a connecting unit 40 is arranged between the two adjacent battery packs corresponding to the vehicle beams 10, and the connecting unit 40 is matched with the locking unit 30 to lock and connect the battery unit 20 to the vehicle beams 10.

Figure 2:
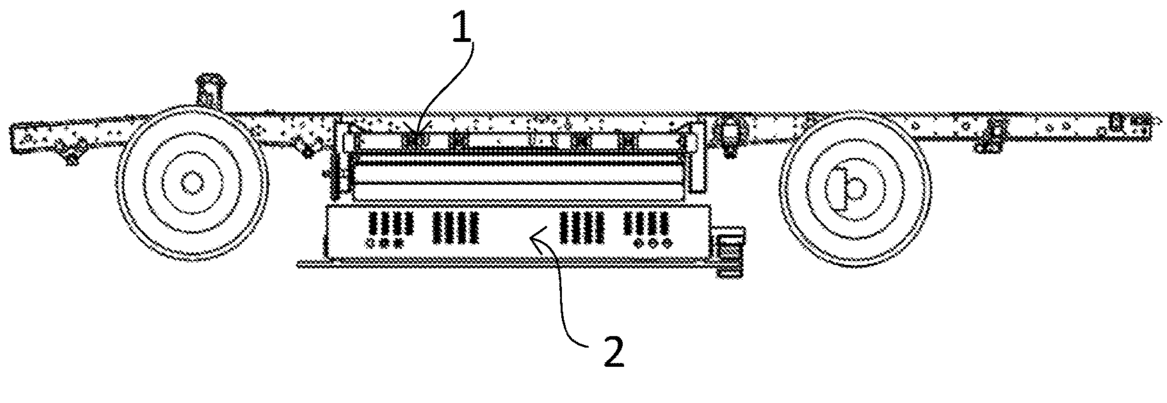
FIG. 2 is a schematic diagram of the structure of an electric vehicle with a battery swapping device under it provided by an embodiment of the present invention

In the specific implementation, as shown in FIG. 1, the electric vehicle 1 is provided with two vehicle beams 10 extending along the length direction of the vehicle and being arranged at intervals along the width direction of the vehicle, and the width direction of the vehicle beams 10 is same as the width direction of the electric vehicle 1. The battery unit 20 is provided with a plurality of battery packs, and the electric energy supplied by a plurality of the battery packs can supply power to a heavy electric vehicle 1 such as truck. And a plurality of battery packs of the battery unit 20 are arranged side by side along the width direction of the vehicle beams 10, so that the battery packs can be arranged as a flat spread way then the overall height of the battery unit 20 is reduced. As shown in FIG. 2, the locking unit 30 is arranged on the vehicle beams 10 in order to swap the battery unit 20 at the bottom of the vehicle, which facilitates the operation of the battery swapping device 2, and also can reserve sufficient space for the battery swapping of the battery swapping device 2, then avoids lifting the vehicle or digging a pit in the ground so that the battery swapping cart can enter and exit the bottom of the vehicle. By arranging a connection unit 40 between the battery packs and connecting with the locking unit 30, the whole battery unit 20 can be connected to the vehicle beams 10 of the electric vehicle 1, then when carrying out battery swapping for a heavy electric vehicle 1, the battery unit 20 can be wholly swapped to meet the requirement of the quick-swapping for the heavy electric vehicle 1. Also, the connection between the battery unit 20 and the vehicle beams 10 can be located in the space between the battery packs to improve the stability of the connection.

As a preferred embodiment, the locking unit 30 comprises a locking containing cavity 31 for the connecting unit 40 entering to lock and fix the battery unit 20, and the locking containing cavity 31 is located under the vehicle beam 10.

Figures 3, 4:
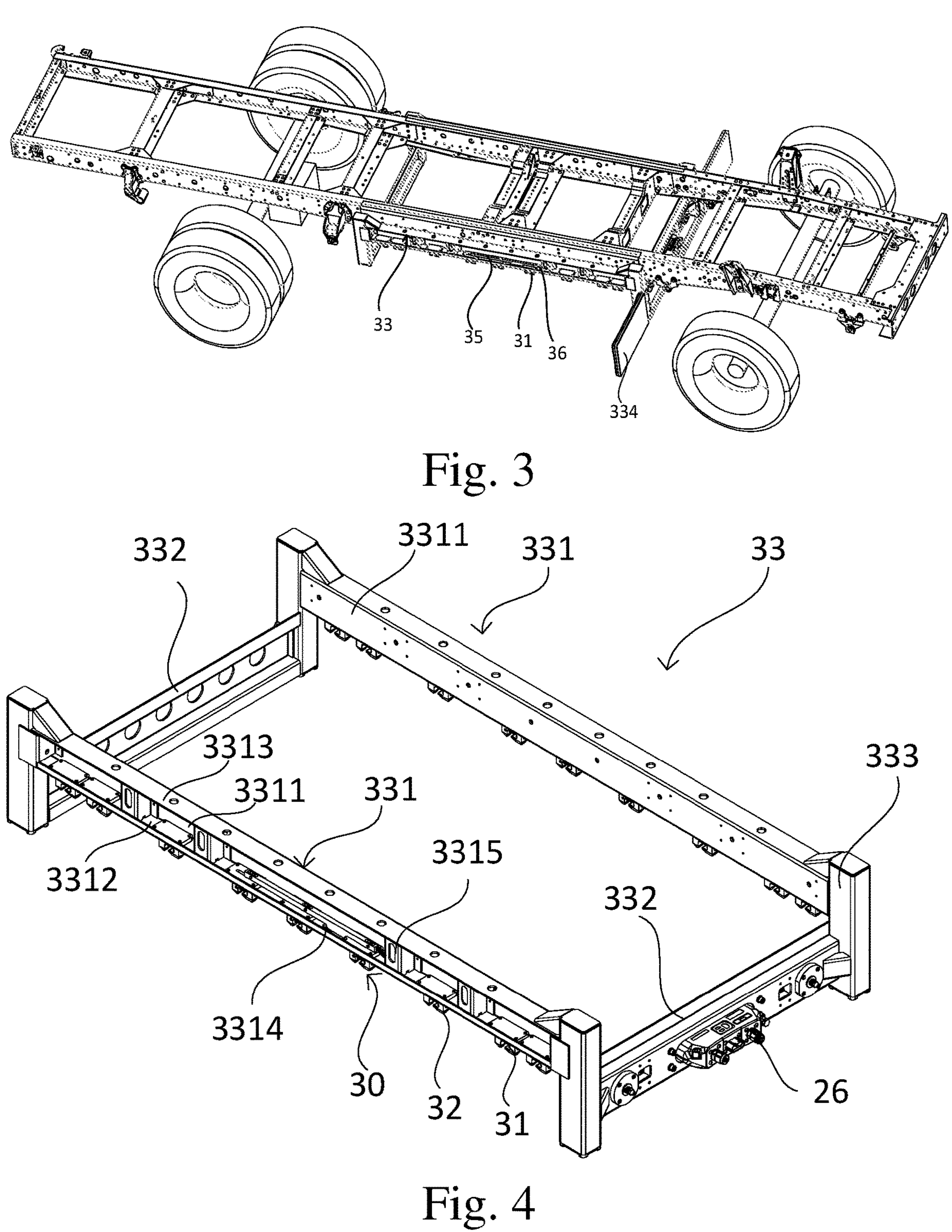
FIG. 3 is a schematic diagram of the structure of a quick-swapping bracket mounted on vehicle beams provided by an embodiment of the present invention, wherein the locking containing cavity is located under the vehicle beams.
FIG. 4 is a schematic diagram of the structure of the quick-swapping bracket in FIG. 3.

As shown in FIG. 1 and FIG. 3, the locking containing cavity 31 is located under the vehicle beam 10, and when the battery unit 20 is locked in the locking containing cavity 31, the locking position of the battery unit 20 is also located under the vehicle beam 10. When dismounting the used battery unit 20 from the electric vehicle 1, the battery swapping device 2 can drive the battery unit 20 to move in order to be separated from the locking containing cavity 31; and moreover, the battery swapping device 2 only needs to move the battery unit 20 downward for a shorter distance, then it can avoid for the vehicle beam 10 and the locking unit 30, and enter and exit the bottom of the vehicle beam 10 along the horizontal direction, which reserves sufficient space for the battery swapping device 2 carrying the battery unit 20 to enter and exit the bottom of the vehicle beam 10, and avoids that the parts on the vehicle interfere with the battery swapping device entering and exiting the bottom of the vehicle. When the battery unit 20 is horizontally moved out of the electric vehicle 1, since the locking position is located under the vehicle beam 10, the battery unit 20 can move horizontally and leave from the bottom of the electric vehicle 1 after it is separated from the locking containing cavity 31; thereby reducing the moving distance of the battery swapping device along the vertical direction and improving the battery swapping efficiency.

In the specific embodiment, the locking containing cavity 31 may take various structure configurations, for example, the locking containing cavity 31 may be arranged on the locking base 32 or may be directly arranged on the bracket, and some of the embodiments twill be illustrated in detail as following, but should not be limited to the following embodiments.

As a preferred embodiment, as shown in FIG. 3 and FIG. 4, the locking unit 30 comprises a locking base 32, and a locking containing cavity 31 is arranged in the locking base 32, and the locking base 32 is connected to the vehicle beam 10.

The locking containing cavity 31 is formed by arranging the locking base 32, which facilitates structural modification for the locking base 32 to adapt to the structure of the connecting unit 40; and moreover, by mounting the locking base 32 on the vehicle beam 10, the structure modification for the main beam of the vehicle body can be avoided and the modification for the present electric vehicle 1 can be carried out; and in addition, the locking base 32 is connected to the vehicle beam 10 in order to bear the weight of the battery unit 20 by utilizing the rigidity of the vehicle beam 10, which makes the locking more stable and reliable.

In the specific embodiment, the connection of the locking base 32 with the vehicle beam 10 may also take various ways according to the actual situation, and some of the embodiments will be illustrated in detail as following, but should not be limited to the following embodiments.

Figures 5, 6:
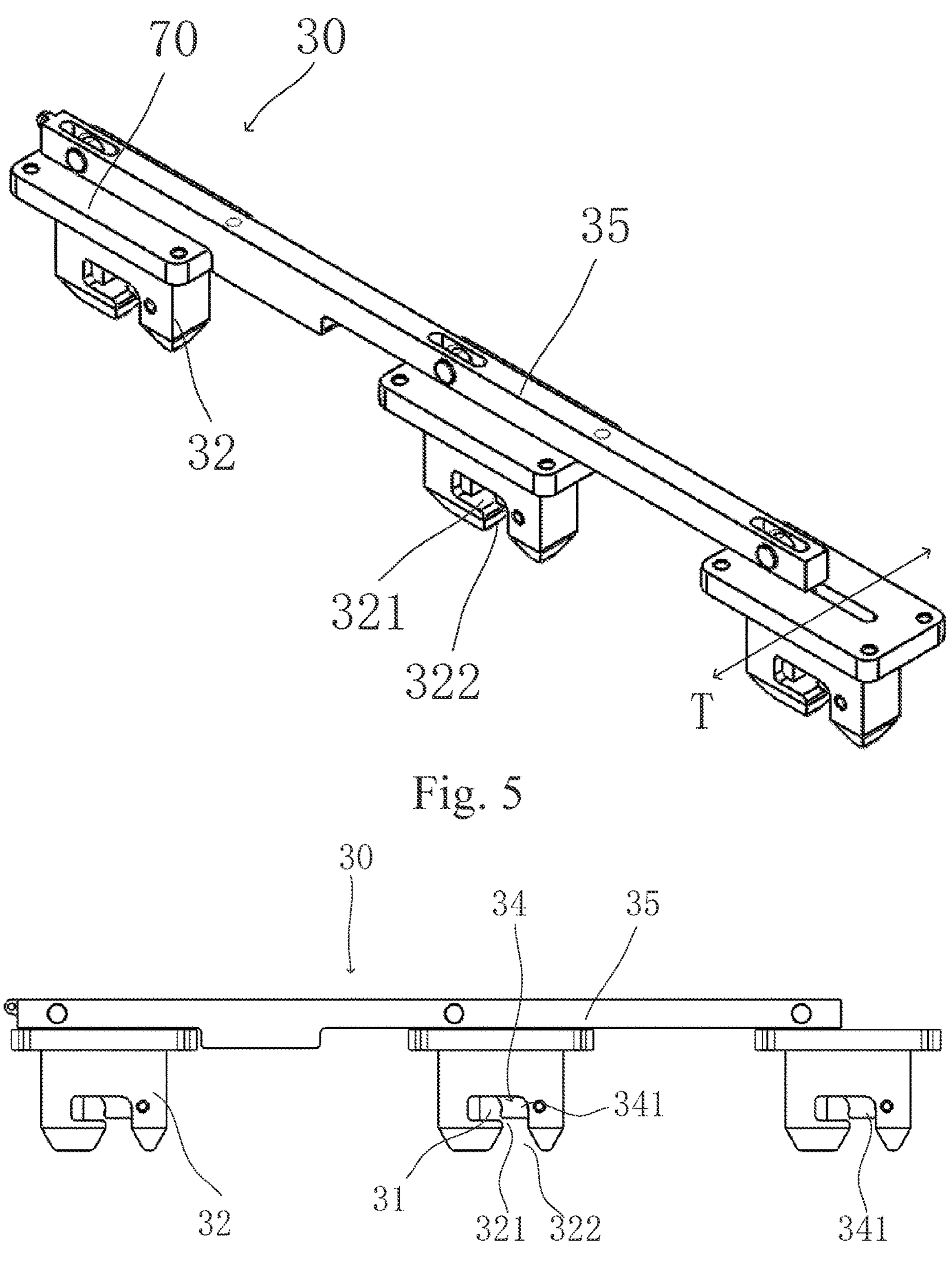
FIG. 5 is a schematic diagram of the three-dimensional structure of a locking unit provided by an embodiment of the present invention.
FIG. 6 is a schematic diagram of the planar structure of a locking unit provided by an embodiment of the present invention.

As a preferred embodiment, as shown in FIG. 5, the locking unit 30 comprises a mounting base 70, and the locking base 32 is connected to the bottom of the vehicle beam 10 by means of the mounting base 70.

In the specific embodiment, a single locking base 32 or a plurality of locking bases 32 can be mounted at the same time on the bottom of the vehicle beam 10 by one mounting base 70, and a plurality of mounting bases 70 can be arranged on the same vehicle beam 10. Thus, on the condition of realizing the connection with the connecting unit 40, the locking base 32 can be flexibly mounted according to the locking requirement. For example, the locking base 32 can be arranged at the corresponding position where the structure of the connecting unit 40 is on the vehicle beam 10 by means of the mounting base 70, or can be arranged in combination with the structure of the vehicle beam 10, like avoiding necessary area to arrange the locking base 32. So that it can adapt to different structures of the vehicle beam 10, and can adapt to different connecting units 40 to carry out flexible arrangement. Besides, the mounting base 70 can be connected to the bottom of the vehicle beam 10, which can reserve sufficient space for mounting the mounting base 70. Alternatively, in some embodiments, the mounting base 70 can also be connected to the side surface of the vehicle beam 10, such as an L-shaped bended member, while the locking base 32 is located under the vehicle beams 10.

Figure 7:
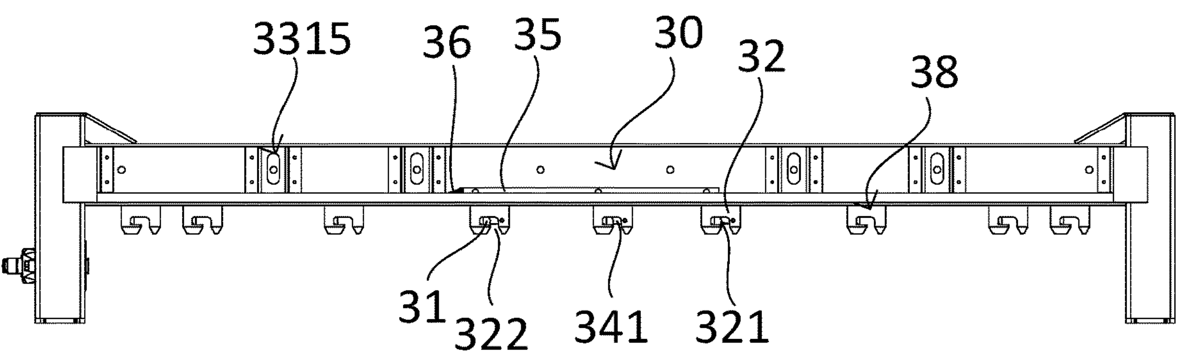
FIG. 7 is a schematic front view diagram of the quick-swapping bracket of FIG. 4.

As another preferred embodiment, as shown in FIG. 3, FIG. 4 and FIG. 7, the locking base 32 is connected to the vehicle beams 10 by means of a quick-swapping bracket 33, and the quick-swapping bracket 33 is connected to the side surface of the vehicle beam 10.

In the specific embodiment, all of the locking bases 32 on one side of the vehicle beam 10 can be arranged on the quick-swapping bracket 33, so that by mounting the quick-swapping bracket 33 on the vehicle beams 10, a plurality of locking bases 32 can be mounted on one side of the vehicle beam 10 to improve the bearing effect of the vehicle beam for the battery unit. Besides, the quick-swapping bracket 33 can be arranged on both sides of the vehicle beam 10, so that all the locking bases 32 needed to be mounted on both sides of the vehicle beam 10 can be mounted on both sides of the vehicle beam 10 just by mounting the quick-swapping bracket 33, moreover, the quick-swapping mechanism such as electric connectors of the vehicle can also be integrated on the quick-swapping bracket 33 to realize the integral installation and uninstallation of the quick-swapping mechanism, thus simplifies the installation steps and processes, and improves the installation efficiency. When modifying the present electric vehicle 1, the locking base 32 can be assembled onto the quick-swapping bracket 33 at first, and then the quick-swapping bracket 33 with the locking base 32 can be directly installed on the vehicle beams 10, then on one hand, the locking base 32 can be mounted according to the need of bearing weight, and on the other hand, big modifications to the structure of the beam 10 can be avoided.

Besides, under the condition not interfering with the components in the vehicle beams 10, the mounting base 70 can be connected to the outer side surface of the vehicle beams 10 or with the inner side surface of the vehicle beams 10; and the quick-swapping bracket 33 can be connected to the outer side surface of the vehicle beams 10 or with the inner side surface of the vehicle beams 10.

Figure 11:
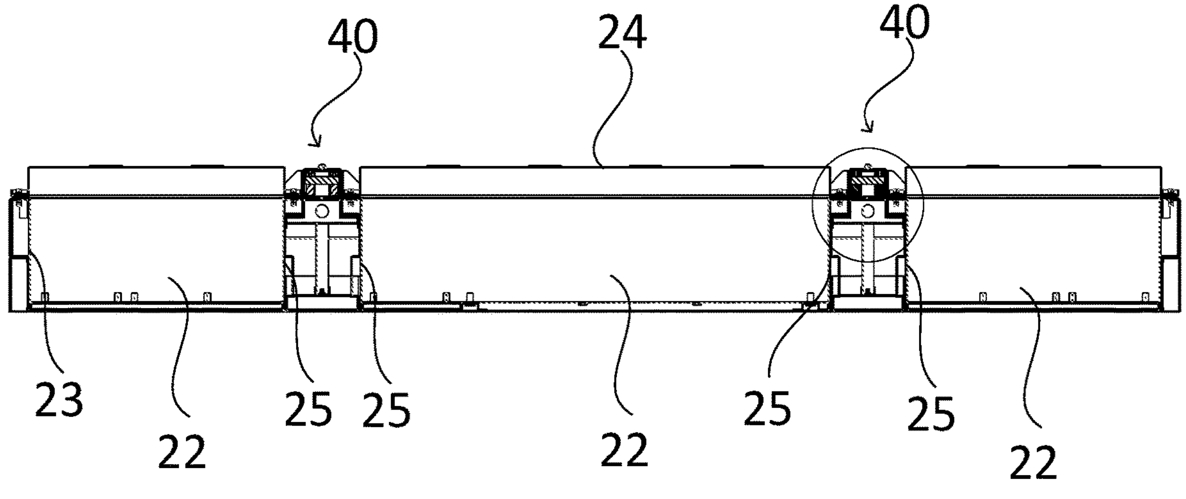
FIG. 11 is a schematic cross-sectional view diagram of a battery unit provided by an embodiment of the present invention, wherein a battery pack in the battery unit is removed.

As a preferred embodiment, as shown in FIG. 11, the connecting unit 40 may comprise a locking shaft 41 and a shaft base 42, and the locking shaft 41 is mounted between the two adjacent battery packs by means of the shaft base 42.

In the specific embodiment, the locking shaft 41 can be locked in the lock containing cavity 31 to enable the battery unit 20 to be connected to the vehicle beam 10. The locking shaft 41 is mounted on the battery unit 20 by means of the shaft base 42, and is located between the two adjacent battery packs, and besides, the force can be transferred to the frame of the battery unit 20 by means of the locking base 32, so that the stability of the connection can be improved by utilizing the structural strength of the battery unit 20.

As a preferred embodiment, as shown in FIG. 11, the shaft base 42 comprises two opposite arranged side plates 421, both ends of the locking shaft 41 are respectively connected to the side plates 421, and the locking shaft 41 is hooked onto the locking unit 30 along the vertical direction.

In the specific embodiment, as shown in FIG. 11, both ends of the locking shaft 41 are connected to the side plates 421, which makes the mounting of the locking shaft 41 is firmer; when the locking shaft 41 is hooked onto the lock unit 30, both ends of the locking shaft 41 can bear force, so that the bearing effect of the locking shaft 41 on the battery unit 20 is improved, and the connection between the battery unit 20 and the vehicle beams 10 is more firm and stable.

As a preferred embodiment, the locking base 32 comprises a locking groove 321, as shown in FIG. 5, and the locking groove 321 penetrates through along the thickness direction T of the locking base 32, and the locking containing cavity 31 is located in the locking groove 321, and the locking groove 321 is used to hook the locking shaft 41 along the vertical direction.

It can be understood that when the locking containing cavity 31 is located in the through locking groove 321, the force applied by the locking groove 321 on the locking shaft 41 can be dispersed to the side plates 421 on both sides, so that the number of the applied force points on the battery unit 20 is increased and the applied force at the single force point of the battery unit 20 is reduced, thereby improving the support strength of the locking base 32 supporting the locking shaft 41.

As a preferred embodiment, as shown in FIG. 6 and FIG. 7, the locking base 32 comprises an open groove 322, and the open groove 322 is communicated with the locking groove 321, and the open groove 322 is a penetrate groove, and the open groove 322 is used for the locking shaft 41 entering into the locking groove 321 and being locked in the locking containing cavity.

In the specific embodiment, by the open groove 322 and the locking groove 321 which is communicated with the open groove 322, the locking shaft 41 can enter into the locking groove 321 from the open groove 322 and finally be locked in the locking containing cavity 31, specifically, as shown in FIG. 6 and FIG. 7, the open groove 322 extends along the vertical direction, and the locking groove 321 extends along the horizontal direction, during the battery unit 40 is mounted on the vehicle beams, under the action that the battery unit 20 is lifted by the battery swapping device 2, so that the locking shaft 41 of the battery unit 20 can move upward along the vertical direction, pass through the open groove 322 then move to the junction position of the locking groove 321 and the open groove 322, and then under the action of the battery swapping device 2, the locking shaft 41 moves along the horizontal direction and enters into the locking containing cavity 31 of the locking groove 321, and correspondingly, the unlocking of the battery unit 20 can have the reverse steps of the locking steps. The locking and unlocking steps are simple, and can improve the efficiency and success rate of locking or unlocking.

As a preferred embodiment, the distance between the two side plates 421 is greater than the thickness of the locking base 32. By this structure, when the locking unit 31 locks the locking shaft 41, and during the locking shaft 41 enters into the locking groove 321 in the locking base 32, it can avoid the side plates 421 interfering with the locking base 32. Besides, two side plates 421 can also limit the locking base 32 moving along the axial direction of the locking shaft 41, that is, moving along the width direction of the vehicle beams 10, in order to prevent the shaking applied on the battery unit 20 caused in the process of using the electric vehicle 1 then hitting the battery unit 20.

Figure 10:
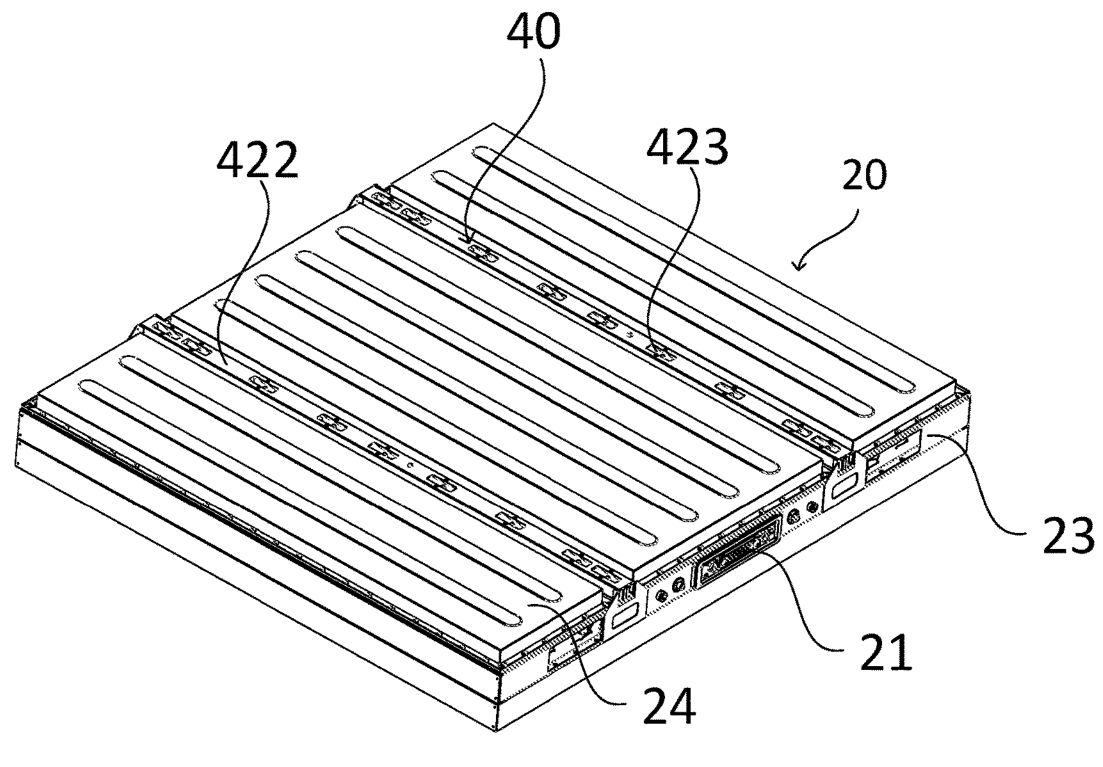
FIG. 10 is a schematic diagram of the structure of a battery unit provided by an embodiment of the present invention.
Figure 12:
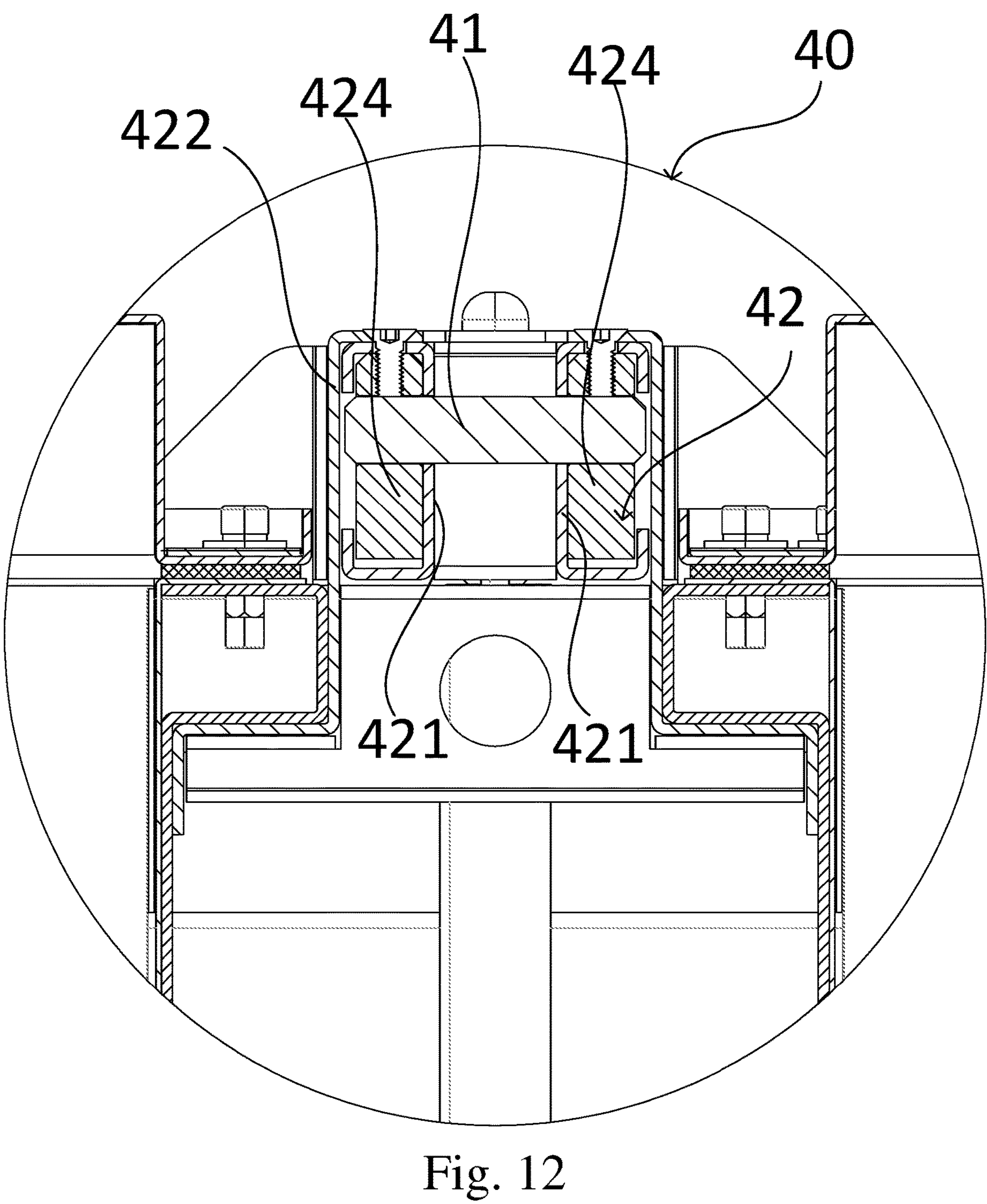
FIG. 12 is a schematic diagram of the structure of a connecting unit provided by an embodiment of the present invention.

As a preferred embodiment, as shown in FIG. 10 and FIG. 12 the battery unit 20 further comprises a top plate 422 arranged between the two side plates 421, and the top plate 422 is provided with a first through hole 423 for the locking base 32 passing through, so that the locking shaft 41 reaches the inside of the locking containing cavity 31 of the locking base 32.

As shown in the figures, the side plate 421 can be a frame structure with an opening on one side and a bend at the opening; and the openings of the side plates 421 on both sides are arranged backwards. Shaft columns 424 are further arranged in the side plate 421 along the vertical direction, and both ends of the locking shaft 41 pass respectively through the shaft columns 424 on both sides, so that the bearing effect can be further improved by the shaft columns 424. Both ends of the top plate 422 can be bent downwards and cover outside the side plates 421 on both sides, thereby improving the structural strength of the two side plates 421 and preventing the side plates 421 from deforming or damaging, and improving the structural strength of the whole connecting unit 40. A first through hole 423 is arranged on the upper surface of the top plate 422, and the first through hole 423 can guide the locking base 32 to enter, align and match with the locking shaft 41.

As a preferred embodiment, as shown in FIG. 10, the first through hole 423 extends along the length direction of the vehicle beams 10, and the length of the first through hole 423 is greater than the sum of the length of the locking base 32 and the horizontal moving distance of the locking shaft 41 in the locking groove 321. Thus, it can avoid interfering the locking shaft 41 to move along the horizontal direction in the locking groove 321. The horizontal moving distance of the locking shaft 41 in the locking groove 321 means the distance that the locking shaft 41 moves from the junction position of the open groove 322 and the locking groove 321 to the locking position in the locking containing cavity 31, when the locking shaft 41 is at the locking position, the locking tongue 34 closes the open groove 322.

As a preferred embodiment, when the locking shaft 41 is located in the locking containing cavity 31, the distance between the center of the locking shaft 41 and the bottom surface of the first through hole 423 is smaller than the distance between the center of the locking shaft 41 and the bottom of the vehicle beams. Thereby avoiding the interference of the locking shaft 41 moving in the locking base 32 along the vertical direction.

It can be understood that when having other locking or unlocking paths between the locking shaft 41 and the locking base 32, the length of the first through hole 423 as mentioned above, the distance between the center of the locking shaft 41 and the bottom surface 3312 of the first through hole 423 may have other length relationships, in order to avoid interfering the locking shaft 41 moving in the locking base 32.

As a preferred embodiment, as shown in FIG. 6, the locking unit 30 further comprises a locking tongue 34, and the locking tongue 34 is rotatably connected to the locking base 32, in order to open or close the open groove 322. Therefore, the locking shaft 41 can be limited in the locking base 32 by means of the locking tongue 34, and the locking stability of the locking unit 30 to the locking shaft 41 can be realized.

In the specific embodiment, as shown in FIG. 6, the locking tongue 34 is provided with a bulged part 341 which is able to block the communication between the open groove 322 and the locking groove 321, and when the bulged part 341 blocks the open groove 322 and the locking groove 321, the space between the bulged part 341 and the locking groove 321 forms a locking containing cavity 31. When the locking tongue 34 rotates and leave away from the locking base 32, the bulged part 341 can rotate accordingly so that the open groove 322 communicates with the locking groove 321.

As a preferred embodiment, as shown in FIG. 5 and FIG. 6, the locking unit 30 comprises at least two locking bases 32, and each of the locking bases 32 is rotatably connected to a locking tongue 34, and the locking unit 30 further comprises a lock connecting rod 35, and the lock connecting rod 35 is rotatably connected to a plurality of locking tongues 34. By the lock connecting rod 35, a plurality of locking tongues 34 can be unlocked to improve the unlocking efficiency, and also can avoid unlocking failure due to inconsistent unlocking time caused by a plurality of locking tabs 34 unlocking respectively.

As a preferred embodiment, as shown in FIG. 7, the locking unit 30 comprises a reset piece 36, and one end of the reset piece 36 is connected to the lock connecting rod 35, and the other end of the reset piece 36 is connected to the quick-swapping bracket 33 or the vehicle beams 10.

It can be understood that in the process of the downward resetting movement of the lock connecting rod 35, the reset piece 36 can apply force onto the lock connecting rod 35, thus it can accelerate the resetting movement of the lock connecting rod 35 and drive the locking tongue 34 connecting with the lock connecting rod 35 to rotate, so as to close the open groove 322, so that the automatic locking can be realized in the locking process. As shown in the figure, in the specific embodiment, the reset piece 36 may be a spring, and the spring can apply an elastic force to the lock connecting rod 35 to accelerate the resetting of the lock connecting rod 35, i.e. reset to the position where the bulged part 341 blocks communication between the open groove 322 and the locking groove 321.

Figure 9:
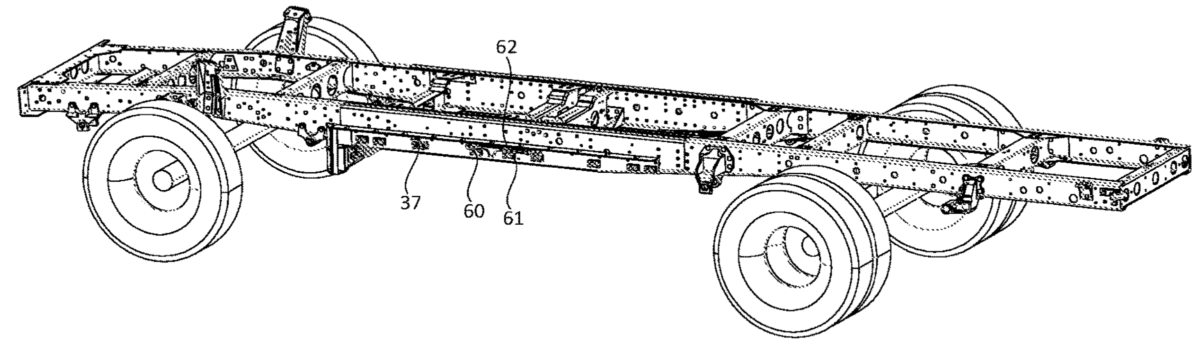
FIG. 9 is a schematic diagram of the structure of another quick-swapping bracket provided by an embodiment of the present invention, wherein the locking containing cavity is located at one side of the vehicle beam.

As another preferred embodiment, as shown in FIG. 9, the locking tongue 34 is provided with an unlocking part 37 extending to the outside of the locking base 32. The locking tongue 34 can be unlocked by directly applying force to the unlocking part 37.

For the above two embodiments, the locking unit 30 may either have any one of the above two embodiments or have both embodiments at the same time. When the locking unit 30 comprises both the locking tongue 34 with the lock connecting rod 35 and the locking tongue 34 with the unlocking part 37, both may constitute a primary locking mechanism and a secondary locking mechanism; specifically, a plurality of locking tongues 34 connecting by means of the lock connecting rod 35 can be used as a primary locking mechanism for implementing primary locking to the battery unit 20; and the single locking tongue 34 with the unlocking part 37 can be used as a secondary locking mechanism, so that when the primary locking mechanism fails, the locking shaft 41 can still be locked to avoid locking failure, which improves the locking reliability of the locking unit 30 to the connecting unit 40.

Figures 13, 14:
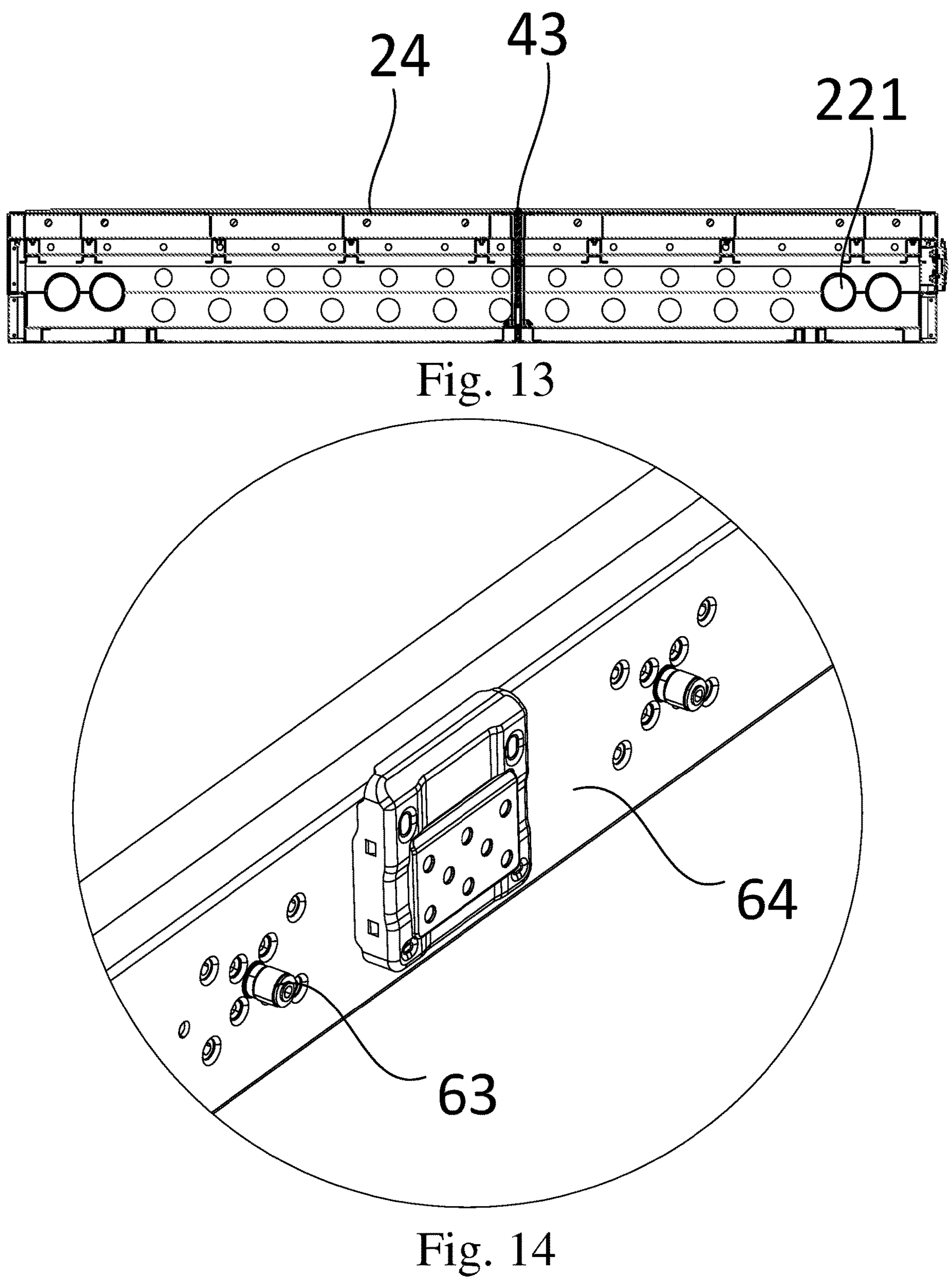
FIG. 13 is a schematic diagram of the structure of the battery unit provided by an embodiment of the invention, wherein the unlocking rod is arranged in the battery unit.
FIG. 14 is a schematic diagram of the structure of the second locking shaft provided by an embodiment of the present invention, which can be matched with the quick-swapping bracket in FIG. 9 in application.

As a preferred embodiment, as shown in FIG. 10 and FIG. 13, the battery unit 20 further comprises an unlocking rod 43, and the unlocking rod 43 is arranged opposite to the unlocking part 37 or the lock connecting rod 35, and is used to push the unlocking part 37 or the lock connecting rod 35 to rotate, so as to make the locking tongue 34 to open the open groove 322, and when the unlocking rod 43 does not act, the lock connecting rod 35 or the locking tongue 34 is reset to the initial state, that is, the locking tongue 34 closes the open groove 322.

In the specific embodiment, as shown in FIG. 13, the unlocking rod 43 can be located in the connecting unit 40 at the position opposite to the unlocking part 37 or the lock connecting rod 35. The unlocking part 37 or the lock connecting rod 35 can be operated by the unlocking rod 43 to open or close the open groove 322, the locking unit 30 can lock the connecting unit 40, and the connecting unit 40 can also be moved out from the locking unit 30.

As a preferred embodiment, as shown in FIG. 4, the quick-swapping bracket 33 for connecting the locking base 32 comprises a bottom surface 3312, and the bottom surface 3312 is provided with a second through hole 3314 for the unlocking lever 43 passing through, in order to act on the lock linkage 35 or the unlocking part 37. On one hand, the bottom surface 3312 of the quick-swapping bracket 33 can improve the structural strength of the quick-swapping bracket 33 itself, and on the other hand, it can also be used as the foundation for mounting the locking base 32, and improves the connection strength between the locking base 32 and the quick-swapping bracket 33, and a second through hole 3314 is arranged on the bottom surface 3312 to facilitate the unlocking rod 43 passing through to perform the unlocking operation.

In the specific embodiment, as shown in FIG. 3 and FIG. 4, the quick-swapping bracket 33 may comprise two longitudinal brackets 331, and the two longitudinal brackets 331 are respectively connected to the two sides of the vehicle beam 10, and specifically, the longitudinal bracket 331 may comprise a side surface 3311, a bottom surface 3312 and a top surface 3313, the bottom surface 3312 and the top surface 3313 are respectively connected to the upper and lower ends of side surface 3311, and side surface 3311 can be connected to the side surface of vehicle beam 10, and locking base 32 can be connected to the bottom surface 3312. Furthermore, the open groove 322 of the locking base 32 and the locking groove 321 are both located under the bottom surface 3312, and the lock connecting rod 35 and the unlocking part 37 are both located above the bottom surface 3312. The second through hole 3314 can be arranged at the position on the bottom surface 3312 of the quick-swapping bracket 33 where is corresponding to the lock connecting rod 35 or the unlocking part 37, so that the unlocking rod 43 can pass through the second through hole 3314 and act on the lock connecting rod 35 or the unlocking part 37, in order to push the lock connecting rod 35 or the unlocking part 37 to rotate, so that the open groove 322 is communicated with the locking groove 321, and the locking shaft 41 can be moved out of the locking base 32. Besides, a supporting column 3315 can be provided between the bottom surface 3312 and the top surface 3313, in order to enhance the structural strength of the longitudinal bracket 331. Specifically, the upper end and the lower end of the supporting column 3315 can be respectively fitted with the top surface 3313 and the bottom surface 3312, and the support column 3315 can be connected to the side surface 3311. Correspondingly, the distance between the top surface 3313 and the bottom surface 3312 is greater than the vertical distance of the lock connecting rod 35 or the unlocking part 37 during the rotation, in order to avoid interfering the rotation of the lock connecting rod 35 or the unlocking part 37.

In the embodiment where the locking base 32 is mounted to the vehicle beams 10 by means of the mounting base 70, the structure of the mounting base 70 can be arranged so that a space for the lock linkage 35 or the unlocking part 37 rotating can be reserved after the locking base 32 is mounted onto the vehicle beams 10. A hole structure similar to the second through hole 3314 can also be arranged on the vehicle beam 10 so that the lock linkage 35 or the unlock part 37 can be rotated to unlock.

As a preferred embodiment, the length of the second through hole 3314 is greater than the horizontal moving distance of the locking shaft 41 in the locking groove 321. Therefore, the interference with the horizontal moving of the locking shaft 41 of the battery unit in the locking unit 30 during unlocking can be avoided, so that the locking shaft 41 can be moved in the locking groove 321 to the position corresponding to the open groove 322.

In the specific embodiment, as shown in FIG. 4 and FIG. 7, the locking unit 30 may further comprise a supporting base 38, and the connecting unit 40 may comprise a supporting shaft, and the supporting base 38 has a similar structure to the locking base 32, and the supporting shaft can have a similar structure to the locking shaft 41. However, comparing with the locking base 32, the supporting base 38 is not provided with the lock tongue 34 inside it, and under the action of the battery swapping device 2, the supporting shaft can enter into the supporting base 38, and be supported by the supporting base 38, which increases the connection points between the locking unit 30 and the connecting unit 40 and reduce the force applied on a single connection point.

As a preferred embodiment, as shown in FIGS. 3-4, a plurality of locking shafts 41 and a plurality of locking bases 32 are all arranged along the length direction of the vehicle beam 10. So that the supporting points of the battery pack are corresponding to the vehicle beams 10, then improves the support strength of the vehicle beams 10 to the battery pack.

Figure 8:
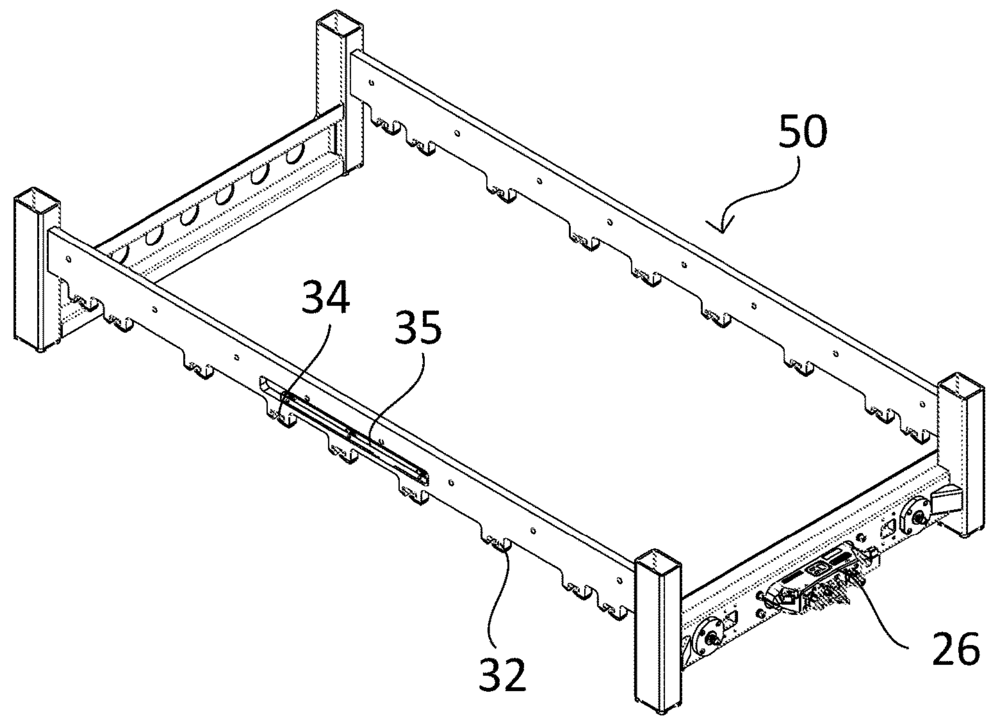
FIG. 8 is a schematic diagram of the structure of another quick-swapping bracket provided by an embodiment of the present invention, wherein the locking containing cavity is located under the vehicle beams.

In the above-mentioned embodiment, the way that the locking base 32 is used to lock the battery pack is given, and in the specific embodiment, as another preferred embodiment, as shown in FIG. 8, the connecting unit 40 is connected to the vehicle beams 10 by means of the connecting bracket 50, and the connecting bracket 50 is provided with a connecting groove passing through along the width direction of the vehicle beams 10 for containing and locking the connecting unit 40. Therefore, a through connecting groove can be directly arranged on the connecting bracket 50 to contain the locking shaft 41, that is, the connecting bracket 50 can perform the function of connecting with the vehicle beams 10, meanwhile it also can directly lock and connect the battery unit 20, thus the structure is simple, and the manufacturing cost is low.

As a preferred embodiment, as shown in FIG. 10 and FIG. 11, the upper surface of the connecting unit 40 is not higher than the upper surface of the battery pack.

It can be understood that the upper surface of the connecting unit 40 is not higher than the upper surface of the battery pack, which can further reduce the overall height of the battery pack; meanwhile, it can contain the partial height of the locking unit 30, so that the height that the battery pack away from the ground can be further increased, which facilitates the battery swapping device 2 as chassis-type entering and exiting under the vehicle beams 10 to dismount and mount the battery, then can reserves more space for the battery swapping device 2 to carry out battery swapping under the vehicle beams 10. Besides, it can be understood that the upper surface of the connecting unit 40 may also be slightly higher than the upper surface of the battery pack, and the connection position between the connecting unit 40 and the locking unit 30 may be wholly or partially located below the upper surface of the battery pack.

In the above contents, the embodiment that the locking containing cavity 31 is located under the vehicle beams 10 is given, and the locking containing cavity 31 can be a form like a penetrate groove structure. In other embodiments, the locking containing cavity 31 may also be located at one side of the side surfaces of the vehicle beam 10, to distinguish it from the above-mentioned lock containing cavity 31, it will be further described as the second locking containing cavity 60 and combining with FIG. 9 and FIG. 14 as following.

As a preferred embodiment, as shown in FIG. 9, the locking unit 30 comprises a second locking cavity 60 for the connecting unit 40 entering to lock and fix the battery unit 20, and the second locking containing cavity 60 is located at one side of the side surfaces of the vehicle beam 10.

In the specific embodiment, as shown in the figures, the second locking containing cavity 60 may be located at one side of the vehicle beam 10, the connecting unit 40 is located between the two adjacent battery packs, and the upper surface of the connecting unit 40 can be lower than the upper surface of the position where the battery pack is located in the battery unit 20, or slightly higher than the upper surface of the position where the battery pack is located in the battery unit 20. When the connecting unit 40 is connected to the second locking containing cavity 60 located at the side of the vehicle beam 10, the battery pack can be located at the side of the vehicle beam 10, so that the distance between the lower surface of the battery unit 20 and the bottom can be further increased, then reserves more space for the battery swapping device 2 entering under the vehicle to carry out battery swapping.

In the specific embodiment, the second locking containing cavity 60 can adopt various structural type, for example, the second locking containing cavity 60 can be arranged on the second locking base 61, or the second locking containing cavity 60 can be arranged directly on the bracket, and some of the embodiments will be described in detail as following, but should not be limited to the following embodiments.

As a preferred embodiment, as shown in FIG. 9, the locking unit 30 comprises a second locking base 61, and the second locking containing cavity 60 is arranged in the second locking base 61, and the second locking base 61 is connected to the vehicle beam 10. Locking by the second locking base 61 facilitates the modification of the structure for the second locking base 61 to adapt to the structure of the connecting unit 40, and avoids modifying the structure of the main beam of the vehicle body, then improves stability and reliability of the locking. Besides, the second locking base 61 is connected to the vehicle beam 10, which can bear the weight of the battery unit 20 by utilizing the rigidity of the vehicle beam 10, thus makes the locking more stable and reliable.

As a preferred embodiment, the locking unit 30 comprises a second mounting base 70, and the second locking base 61 is connected to the side surface of the vehicle beam 10 by means of the second mounting base 70.

In the specific embodiment, a single second locking base 61 or a plurality of second locking bases 61 together can be mounted on one side of the vehicle beam 10 by means of one second mounting base 70, and a plurality of second mounting bases 70 can be arranged on the same vehicle beam 10. Therefore, the second locking base 61 can be flexibly mounted according to the locking requirement under the condition of realizing the connection with the connecting unit 40. For example, according to the structure of the connecting unit 40, the locking base 32 may be configured at a position corresponding to the vehicle beams 10 by means of the second mounting base 70, and the second locking base 61 can also be arranged at a position such as avoiding necessary areas in combination with the structure of the vehicle beam 10. Thus, it can be flexibly arranged according to different structures of the vehicle beams 10 and adapted to different connecting units 40.

As a preferred embodiment, as shown in FIG. 9, the second locking base 61 is connected to the vehicle beam 10 by means of a second quick-swapping bracket 62, and the second quick-swapping bracket 62 is connected to the side surface of the vehicle beam 10.

In the specific embodiment, all the second locking bases 61 at one side of the vehicle beam 10 can be arranged on the second quick-swapping bracket 62, so that by mounting the second quick-swapping bracket 62 on the vehicle beam 10, all the second locking bases 61 that need to be mounted thereon are mounted on one side of the vehicle beam 10. Besides, the second quick-swapping bracket 62 can be formed on both sides of the vehicle beam 10, so that by mounting the second quick-swapping bracket 62, then all the second locking bases 61 that need to be mounted at both sides of the vehicle beam 10 are mounted on both sides of the vehicle beam 10, besides, quick-swapping mechanisms such as electrical connectors of the vehicle can also be integrated on the quick-swapping bracket 33 to realize the overall mounting and dismounting of the quick-swapping mechanism, which can simplify the installation steps and processes and improve installation efficiency. When modifying the present electric vehicle 1, the second locking base 61 can be assembled on the second quick-swapping bracket 62 at first, and then the second locking bracket 62 with the second locking base 61 can be directly mounted on the vehicle beam 10, which can save the modification time to the electric vehicle 1.

Besides, under the condition of not interfering with the internal components of the vehicle beam 10, the second mounting base 70 can be connected to the outer side surface of the vehicle beam 10, or can be connected to the inner side surface of the vehicle beam 10; and the second quick-swapping bracket 62 can be connected to the outer side surface of the vehicle beam 10 is connected, and also can be connected to the inner side surface of the vehicle beam 10.

As a preferred embodiment, as shown in FIG. 14, the connecting unit 40 comprises a second locking shaft 63 and a second shaft base 64, and one end of the second locking shaft 63 is connected to the side surface of the second shaft base 64, and extends from the side surface of the second shaft base 64 along the direction toward the vehicle beam 10; and a second locking base 61 is arranged on the vehicle beam 10, comprising a second locking groove 321, and the second locking groove 321 is used to contain the second locking shaft 63.

In the specific embodiment, the second locking base 61 and the second locking shaft 63 can have similar or identical structures as the above-mentioned locking base 32 and the locking shaft 41, and also can form the above-mentioned primary locking mechanism and secondary locking mechanism, also can have the structure as above-mentioned supporting base 38 and supporting shaft.

As a preferred embodiment, as shown in FIG. 9 and FIG. 14, a plurality of second locking shafts 63 and a plurality of second locking bases 61 are all arranged along the length direction of the vehicle beam 10. Therefore, the supporting point of the battery pack corresponds to the vehicle beam 10, which improves the support strength of the vehicle beam 10 to the battery pack.

In the above content, the embodiment that locking the battery unit 20 by means of the locking containing cavity 31 is given, but in other embodiments, the connecting unit 40 can also be connected to the vehicle beam 10 by other ways.

As a preferred embodiment, the connecting unit 40 comprises at least one of a thread connecting member and a T-shaped hooking member, and the thread connecting member is used for threaded connecting the battery unit 20 to the vehicle beams 10, and the T-shaped hooking member is used for rotationally clamping the battery unit 20 to the vehicle beams 10.

Figure 15:
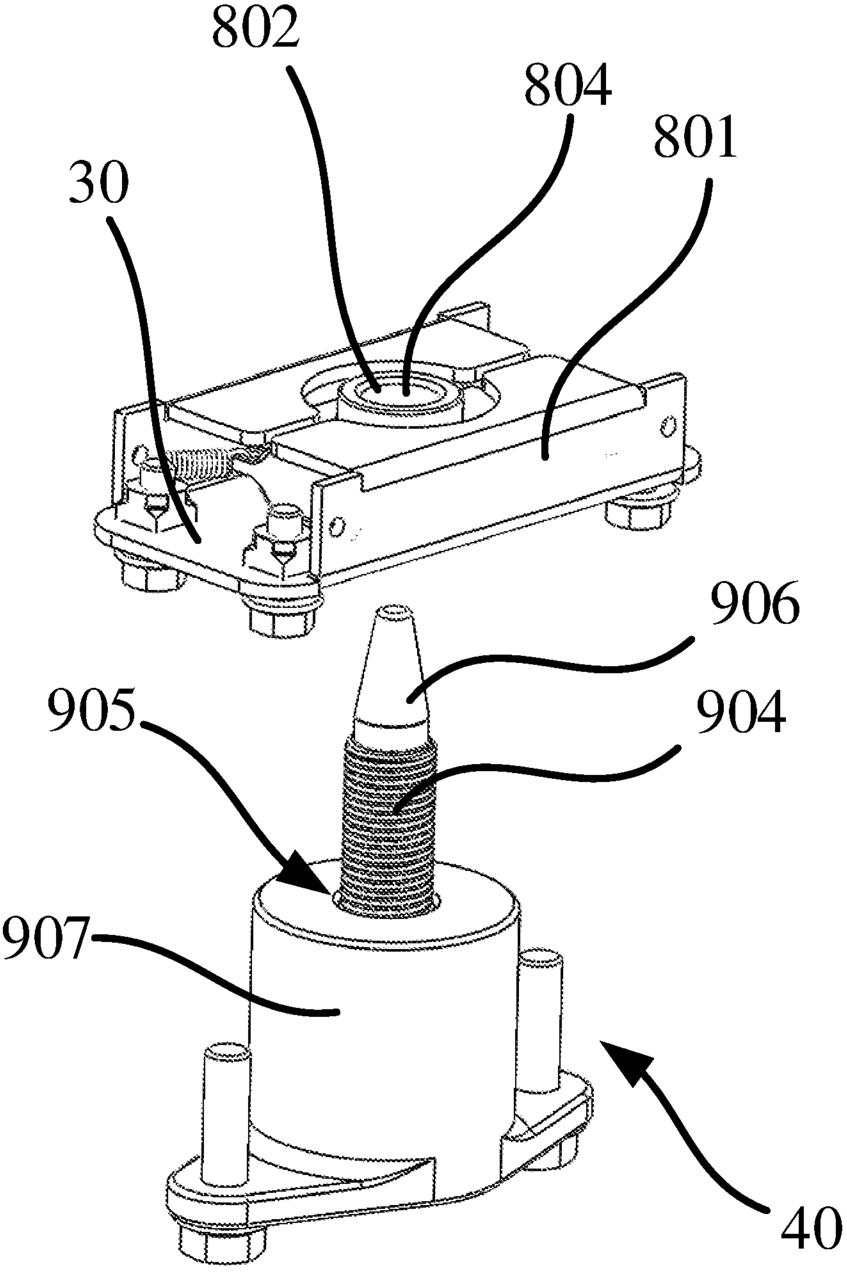
FIG. 15 is a schematic diagram of the structure of a locking unit and a connecting unit for another electric vehicle provided by an embodiment of the present invention, in which the locking unit and the connecting unit are locked together.
Figure 16:
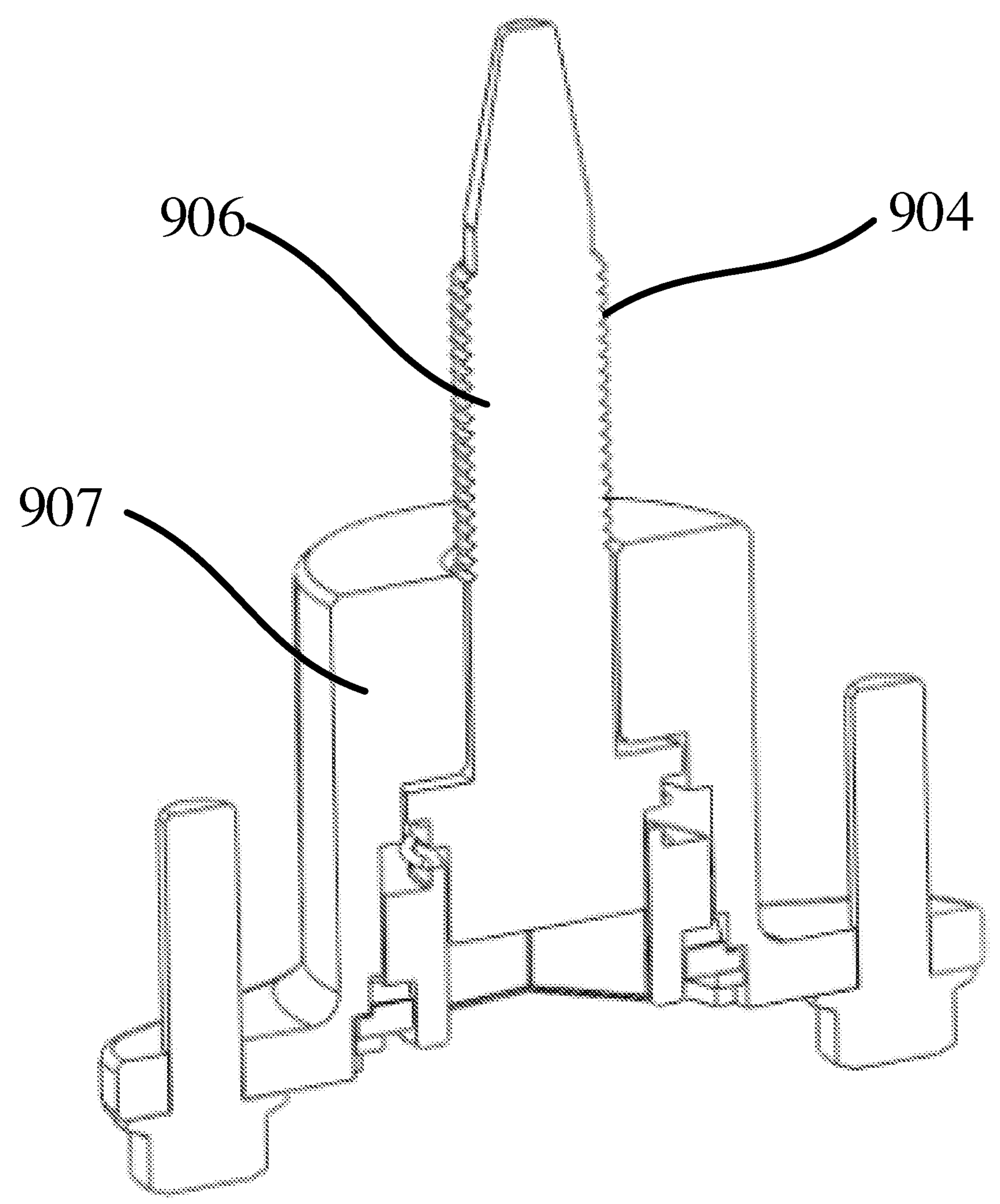
FIG. 16 is a schematic diagram of the structure of a connecting unit of another electric vehicle provided by an embodiment of the present invention.

Specifically, in the threaded connection way, as shown in FIG. 15 and FIG. 16, the locking unit 30 comprises a locking base 801, and the locking base 801 is provided with a first opening 802 extending along the vertical direction, and a first thread part 804 is arranged in the first opening 802, and the first thread part 804 is an internal thread, and the connecting unit 40 comprises a mounting housing 907 and a locking piece 906, and a second opening 905 extends along the vertical direction in the mounting housing 907, and the locking piece 906 is vertically arranged in the second opening 905, and the locking piece 906 can move along the vertical direction relative to the mounting housing 907 and the locking piece 906 is provided with a second thread part 904 matching with the first thread part 804, the second thread part 904 can gear connected to the first thread part 804, in order to realize the locking and unlocking of the locking unit 30 and the connecting unit 40.

Figure 17:
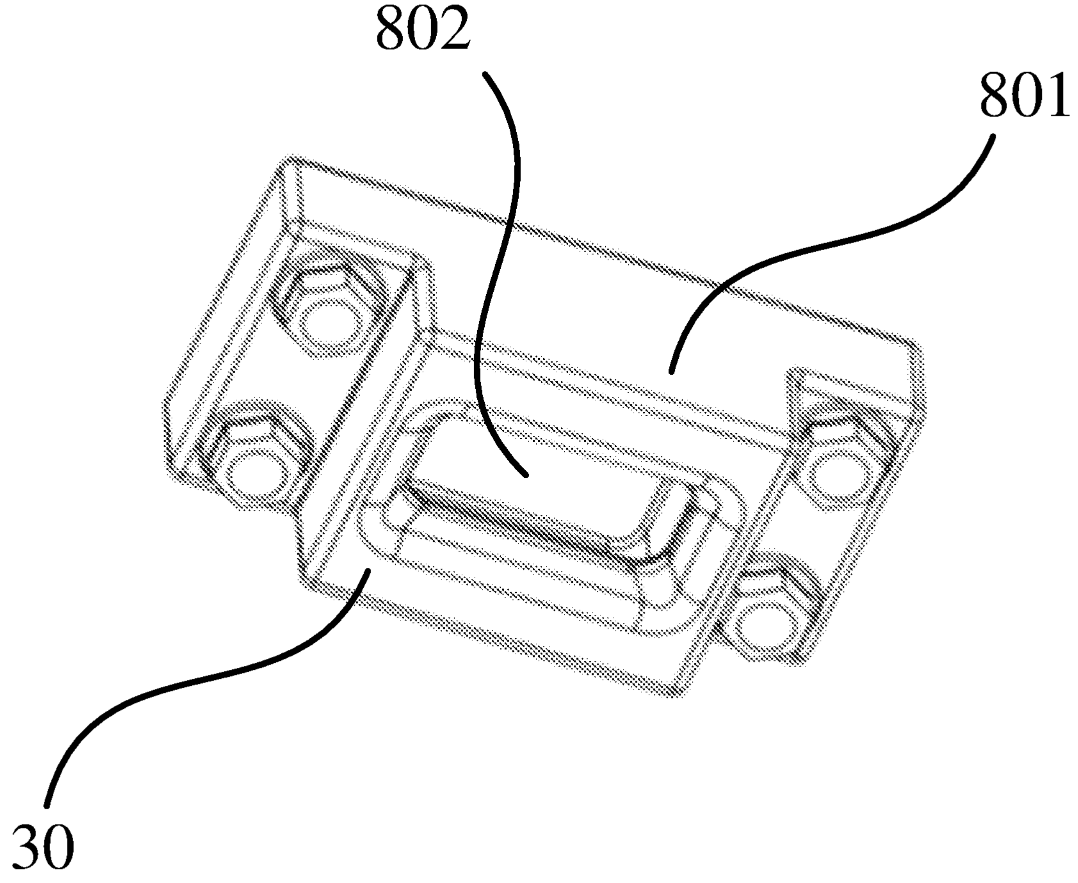
FIG. 17 is a schematic diagram of the structure of a locking unit of another electric vehicle provided by an embodiment of the present invention.
Figure 18:
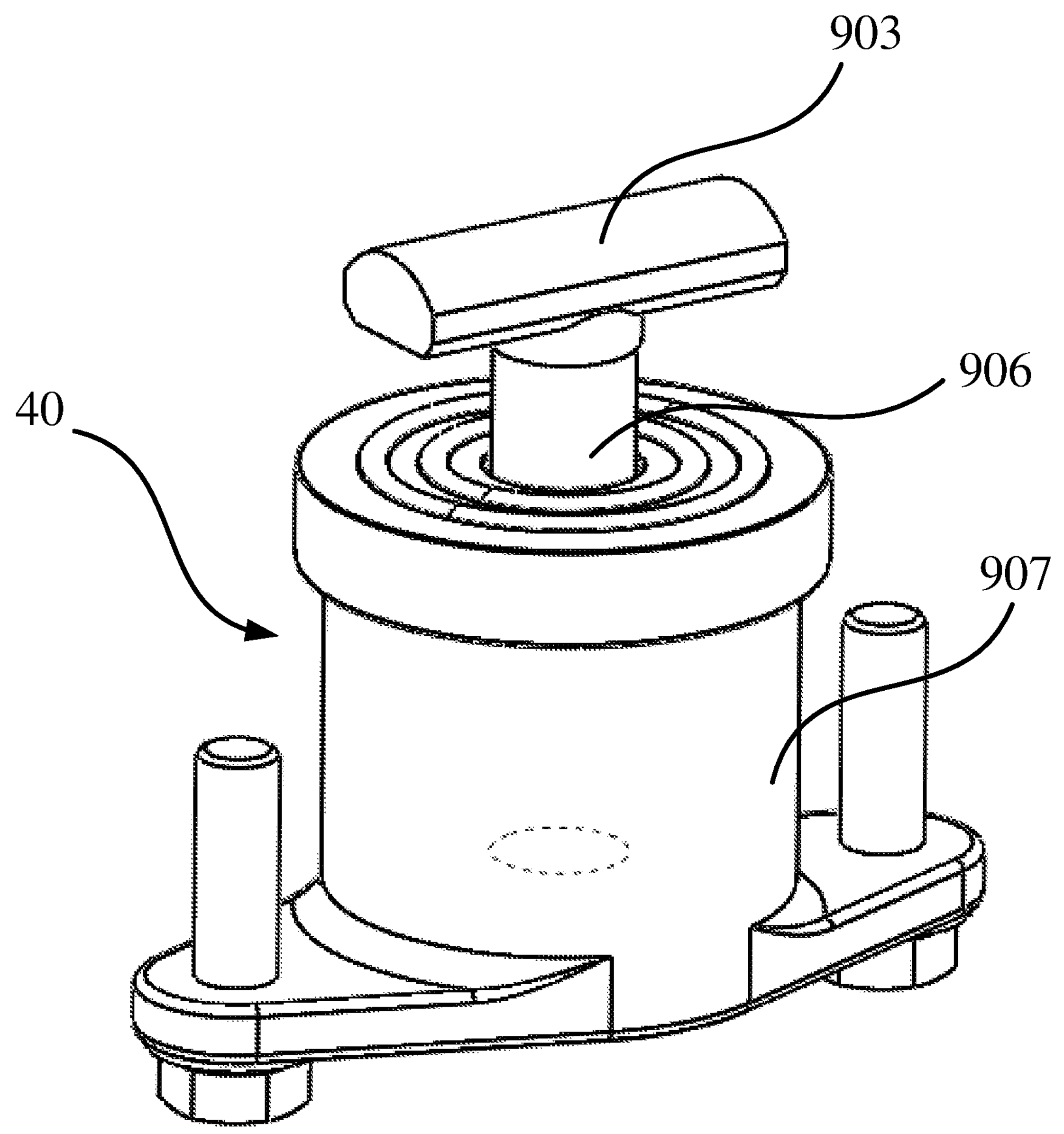
FIG. 18 is a schematic diagram of the structure of a connecting unit of another electric vehicle provided by an embodiment of the present invention.
Figure 19:
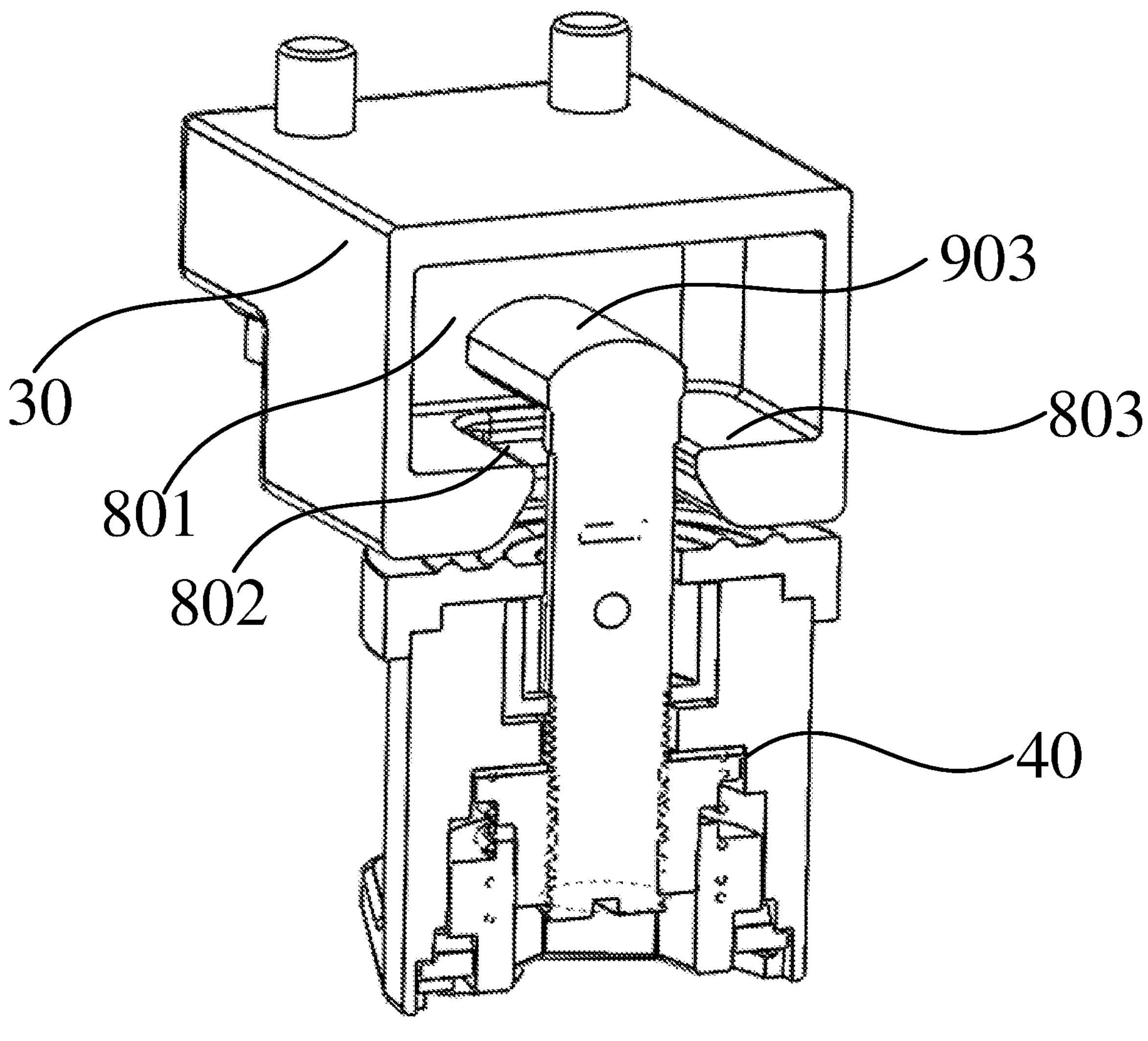
FIG. 19 is a schematic diagram of the structure of a locking unit and a connecting unit for another electric vehicle provided by an embodiment of the present invention, in which the locking mechanism and the locking connecting structure are locked together.

In other specific embodiments, in the way of rotationally clamping, as shown in FIG. 17, FIG. 18 and FIG. 19, the locking unit 30 comprises a locking base 801, and the locking seat 801 is provided with a first opening 802 extending along the vertical direction, and a hooking part 803 is arranged in the locking base 801, and the locking base 801 is provided with a hooking cavity, and the first opening 802 is communicated with the hooking cavity, and the hooking base 803 is located at the bottom of the hooking cavity, in this embodiment, the first opening 802 is a square hole, and the hooking parts 803 are located on both sides of the first opening 802, and the connecting unit 40 comprises a locking piece 906, and the upper end of the locking piece 906 is provided with a hooking rod 903 extending along the horizontal direction, and the hooking rod 903 is a cylinder and is horizontally arranged on the top of the locking piece 906, and the hooking rod 903 and the locking piece 906 together form a T-shaped structure.

When the hooking rod 903 is at the first position, the hooking rod 903 can pass through the first opening 802 and enters into the hooking cavity in the locking base 810, and when the hooking rod 903 in the hooking cavity is rotated to the second position, the hooking rod 903 can be hooked onto the limiting part 803, so that the locking unit 30 and the connecting unit 40 are matched, locked and fixed.

As a preferred embodiment, as shown in FIG. 10, the battery unit 20 comprises a first electrical connector 21 and a battery cavity 22 for containing battery packs, and a connecting unit 40 is arranged between the two adjacent battery cavities 22, and as shown in FIG. 13, a through hole 221 is provided between the two adjacent battery cavities 22; and the first electrical connector 21 is arranged on the outer side surface of any one of battery cavities 22.

In the specific embodiment, as shown in FIG. 11, the battery unit 20 may comprise a plurality of battery packs, and each battery pack may be arranged in a corresponding battery cavity 22, and the battery cavities 22 may be communicated at partial position, thereby facilitating that a plurality of battery packs are connected together and form an output end with one first electrical connector 21; and when the battery unit 20 is swapped, the electrical connection can be realized by inserting and aligning only one first electrical connector 21. Besides, the wiring connection between the battery packs is implemented inside the battery unit 20, so that the external structure of the battery unit 20 is flat and uniform.

As a preferred embodiment, as shown in FIG. 10 and FIG. 11, the battery unit 20 further comprises a housing 23 and a cover 24, and a plurality of separators 25 are arranged at intervals in the housing 23, and a battery cavity 22 is formed between the separators 25; and the cover 24 is arranged at the opening of each battery cavity 22.

In the specific embodiment, by the structural form of the housing 23 and the cover 24, a plurality of battery packs can be formed into a battery unit 20 as a whole; and in addition, the cover 24 covers at the corresponding position of the housing 23, in order to avoid for the position of the connecting unit 40. As shown in FIG. 11, there are two separators 25 between the two adjacent battery packs, and the connecting unit 40 as any one of the above-mentioned embodiments is arranged between the two separators 25

As a preferred embodiment, as shown in FIG. 3 and FIG. 4, the vehicle further comprises a second electrical connector 26, and the second electrical connector 26 is arranged on the width direction of the vehicle beams 10, and the second electrical connector 26 is used to be connected to the first electrical connector 21, so that the battery unit 20 supplies power to the vehicle.

Wherein, the second electrical connector 26 is also connected to the corresponding circuit on the electric vehicle 1, so that in the specific embodiment, just by connecting the first electrical connector 21 with the second electrical connector 26, it can realize the electrical connection between the battery unit 20 and the vehicle beam 10.

As a preferred embodiment, as shown in FIG. 1 and FIG. 3, the quick-swapping bracket 33 for connecting the locking unit 30 comprises a longitudinal bracket 331 and a transverse bracket 332, and the longitudinal brackets 331 are connected to the vehicle beam 10, and the transverse brackets 332 are connected between the longitudinal brackets 331, and the second electrical connector 26 is arranged on the transverse bracket 332.

As shown in FIG. 3, the longitudinal bracket 331 and the transverse bracket 332 can be connected by means of a connecting column 333, and the end of the longitudinal bracket 331 and the end of the transverse bracket 332 are connected to different sides of the connecting column 333 respectively. On one hand, the transverse bracket 332 can be used for mounting the second electrical connector 26, and when it is mounted on the vehicle beams 10, the locking unit 30 and the electrical connector can be integrally mounted on the vehicle beams 10 at the same time, which avoids repeating alignment debugging for each component being mounted separately, and improves the installation efficiency; and on the other hand, the connection strength between the two longitudinal brackets 331 can be strengthened, so that the overall structural strength of the quick-swapping bracket 33 is improved. In the specific embodiment, the transverse brackets 332 may be arranged at both ends of the longitudinal brackets 331, and a second electrical connector 26 may be arranged on one of the transverse brackets 332, thereby forming a rectangular frame structure to further enhance the overall structural strength of the quick-swapping bracket 33.

As a preferred embodiment, as shown in FIG. 1, the transverse bracket 332 is located under the vehicle beams 10, and the longitudinal bracket 331 is connected to the side surface of the vehicle beams 10, so that the vehicle beams 10 can be avoided from interfering; and the longitudinal bracket 331 is connected to the side surface of the vehicle beams 10, so that the connection area can be increased and the stability of the connection can be improved by utilizing the stiffness of the vehicle beams 10.

In the specific embodiment, as shown in FIG. 3, the longitudinal bracket 331 and the transverse bracket 332 are connected at different height positions of the connecting column 333.

As a preferred embodiment, as shown in FIG. 1, the transverse bracket 332 covers at least partial area of the end of the battery unit 20. Therefore, the connection between the electrical connectors can is supported during docking.

As shown in FIG. 1, baffles 334 may also be arranged on both sides of the quick-swapping bracket 33, and the baffles 334 are connected to the side surface of the connecting column 333, and the side surface is preferably the side surface opposite to the side surface where the longitudinal bracket 331 is connected to.

As a preferred embodiment, as shown in FIG. 1 and FIG. 10, the battery unit 20 comprises a side battery pack 27, and the battery pack is arranged outside the vehicle beams 10. Therefore, it can avoid interfering with the structure inside the vehicle beams 10.

As a preferred embodiment, as shown in FIG. 1 and FIG. 9, the battery unit 20 further comprises a central battery pack 28, and the central battery pack 28 is arranged between the two side battery packs 27 and located under the vehicle beams 10.

In the specific embodiment, the central battery pack 28 is provided to improve the power supply capability, or reduce the thickness of the battery unit 20 under the condition of same power supply capability. In addition, the central battery pack 28 is arranged under the vehicle beams 10 to avoid interfering with the components between the two vehicle beams 10 and facilitate guiding the second electrical connector 26 and connecting with the first electrical connector 21.

As a preferred embodiment, the central battery pack 28 is provided with an avoidance opening, which is used to avoid for the transmission shaft of the electric vehicle 1.

The embodiment of the invention also provides a quick-swapping assembly, and the quick-swapping assembly is used for the electric vehicle 1 as described above;

The quick-swapping assembly comprises a locking unit 30 and a battery unit 20, and the locking unit 30 is used for connecting with the vehicle beams 10, and the battery unit 20 comprises a plurality of battery packs, and a connecting unit 40 is arranged between the two adjacent battery packs corresponding to the vehicle beams 10, and the connecting unit 40 is matched with the locking unit 30.

It can be understood that the locking unit 30 in the quick-swapping assembly can take the lock unit 30 according to any one of the above embodiments, and the battery unit 20 can take the battery units 30 according to any one of the above embodiments. By the quick-swapping assembly, the present electric vehicle 1 can be modified so that the originally fixed-type direct-charge battery can be changed into a dismountable battery unit 20, so that the used battery unit 20 on the electric vehicle 1 can be quickly swapped and the fresh battery unit 20 also can be quickly mounted on the electric vehicle 1.

By taking the technical solution as above-mentioned embodiments, the height space under the vehicle beams is fully utilized, and when the battery swapping device 2 dismounts the battery unit, the empty battery swapping device 2 can directly enter the space under the battery unit and does not interfere with the bottom of the electric vehicle; and when the battery unit is mounted by the battery swapping device 2, the battery swapping device carrying the battery unit also can be directly enter under the vehicle beams to carry out batter swapping without interfering with the bottom of the electric vehicle. In the whole process, there is no need to lift the car body, set up a sunken space or dig a pit for the battery swapping device 2 entering or exiting, so that the cost, time and difficulty are reduced to build a battery swapping station and the requirements for building a station site are reduced, and the efficiency of battery swapping is improved. The technical solution in the above-mentioned embodiments is particularly suitable for commercial vehicles such as heavy trucks and light trucks.

Although the specific embodiments of the present disclosure are described above, it should be understood by those skilled in the art that this is only an example, and the scope of protection of the present disclosure is defined by the appended claims. Those skilled in the art can make various changes or modifications to these embodiments without departing from the principles and essence of the present disclosure, but these changes and modifications fall into the scope of protection of the present disclosure.

What is claimed is:

1. An electric vehicle, wherein, the electric vehicle comprises vehicle beams and a battery unit, and the battery unit comprises a plurality of battery packs arranged side by side along a width direction of the vehicle beams;

a locking unit is arranged on the vehicle beams, and a connecting unit is arranged between two adjacent battery packs corresponding to the vehicle beams, and the connecting unit is matched with the locking unit to lock and connect the battery unit to the vehicle beams;

the locking unit comprises a locking containing cavity for the connecting unit entering in order to lock and fix the battery unit, and the locking containing cavity is located under the vehicle beams.

2. The electric vehicle according to claim 1, wherein, the locking unit comprises a locking base, and the locking containing cavity is arranged in the locking base, and the locking base is connected to the vehicle beams;

the locking unit comprises a mounting base, and the locking base is connected to a bottom of the vehicle beams by means of the mounting base; or, the locking base is connected to the vehicle beams by means of a quick-swapping bracket, and the quick-swapping bracket is connected to a side surface of the vehicle beams.

3. The electric vehicle according to claim 2, wherein, the connecting unit comprises a locking shaft and a shaft base, and the locking shaft is mounted between the two adjacent battery packs by means of the shaft base.

4. The electric vehicle according to claim 3, wherein, the shaft base comprises two opposite arranged side plates, and both ends of the locking shaft are respectively connected to the side plates, and the locking shaft is hooked onto the locking unit;

or, a plurality of locking shafts and a plurality of locking bases are all arranged along a length direction of the vehicle beams.

5. The electric vehicle according to claim 4, wherein, the locking base comprises a locking groove, and the locking groove penetrates through along a thickness direction of the locking base, and the locking containing cavity is positioned in the locking groove, and the locking groove is used to hook the locking shaft.

6. The electric vehicle according to claim 5, wherein, the locking base comprises an open groove, and the open groove is communicated with the locking groove, and the open groove is a penetrate groove, and the open groove is used for the locking shaft entering into the locking groove and being locked in the locking containing cavity;

or, a distance between the two side plates is greater than the thickness of the locking base;

the battery unit further comprises a top plate arranged between the two side plates, and the top plate is provided with a first through hole for the locking base passing through, so that the locking shaft reaches an inside of the locking containing cavity of the locking base;

the first through hole extends along the length direction of the vehicle beams, and a length of the first through hole is greater than a sum of the locking base's length and a horizontal moving distance of the locking shaft in the locking groove; and/or, when the locking shaft is located in the lock containing cavity, a distance between the center of the locking shaft and a bottom surface of the first through hole is smaller than a distance between a center of the locking shaft and a bottom of the vehicle beams.

7. The electric vehicle according to claim 6, wherein, the locking unit further comprises a locking tongue, and the locking tongue is rotatably connected to the locking base, in order to open or close the open groove.

8. The electric vehicle according to claim 7, wherein, the locking unit comprises at least two locking bases, and each of the locking bases is rotatably connected to the locking tongue, and the locking unit further comprises a lock connecting rod, and the lock connecting rod is rotatably connected to a plurality of locking tongues;

or, the locking unit comprises at least two locking bases, and each of the locking bases is rotatably connected to the locking tongue, and the locking unit further comprises a lock connecting rod, and the lock connecting rod is rotatably connected to a plurality of locking tongues, the locking unit comprises a reset piece, and one end of the reset piece is connected to the lock connecting rod, and an other end of the reset piece is connected to a quick-swapping bracket or the vehicle beams.

9. The electric vehicle according to claim 8, wherein, the locking tongue is provided with an unlocking part extending to an outside of the locking bases.

10. The electric vehicle according to claim 9, wherein, the battery unit further comprises an unlocking rod, and the unlocking rod is arranged opposite to the unlocking part or the lock connecting rod, and is used to push the unlocking part or the lock connecting rod to rotate so that the locking tongue opens or closes the open groove;

or, the battery unit further comprises an unlocking rod, and the unlocking rod is arranged opposite to the unlocking part or the lock connecting rod, and is used to push the unlocking part or the lock connecting rod to rotate so that the locking tongue opens or closes the open groove; the quick-swapping bracket for connecting the locking base comprises a bottom surface, and the bottom surface is provided with a second through hole for the unlocking rod to pass through, in order to act on the lock connecting rod or the unlocking part;

or, the battery unit further comprises an unlocking rod, and the unlocking rod is arranged opposite to the unlocking part or the lock connecting rod, and is used to push the unlocking part or the lock connecting rod to rotate so that the locking tongue opens or closes the open groove; the quick-swapping bracket for connecting the locking base comprises a bottom surface, and the bottom surface is provided with a second through hole for the unlocking rod to pass through, in order to act on the lock connecting rod or the unlocking part; a length of the second through hole is greater than the horizontal moving distance of the locking shaft in the locking groove.

11. The electric vehicle according to claim 2 wherein, the battery unit comprises a first electrical connector and a battery cavity for containing the battery packs, and the connecting unit is arranged between the two adjacent battery cavities, and a through hole is arranged between two adjacent battery cavities; and the first electrical connector is arranged on an outer side surface of any one of the battery cavities;

or, the battery unit comprises a first electrical connector and a battery cavity for containing the battery packs, and the connecting unit is arranged between the two adjacent battery cavities, and a through hole is arranged between two adjacent battery cavities; and the first electrical connector is arranged on an outer side surface of any one of the battery cavities; the battery unit further comprises a housing and a cover, and a plurality of separators are arranged at intervals in the housing, and the battery cavity is formed between the separators; and the cover is arranged at a cavity opening of each battery cavity.

12. The electric vehicle according to claim 11, wherein, the vehicle further comprises a second electrical connector, and the second electrical connector is arranged along the width direction of the vehicle beams, and the second electrical connector is used to be connected to the first electrical connector, so that the battery unit supplies power for the vehicle;

or, the vehicle further comprises a second electrical connector, and the second electrical connector is arranged along the width direction of the vehicle beams, and the second electrical connector is used to be connected to the first electrical connector, so that the battery unit supplies power for the vehicle; the quick-swapping bracket for connecting the locking unit comprises a longitudinal bracket and a transverse bracket, and the longitudinal bracket is connected to the vehicle beams, and the transverse bracket is connected between longitudinal brackets, and the transverse bracket is provided with the second electrical connector;

or, the vehicle further comprises a second electrical connector, and the second electrical connector is arranged along the width direction of the vehicle beams, and the second electrical connector is used to be connected to the first electrical connector, so that the battery unit supplies power for the vehicle; the quick-swapping bracket for connecting the locking unit comprises a longitudinal bracket and a transverse bracket, and the longitudinal bracket is connected to the vehicle beams, and the transverse bracket is connected between longitudinal brackets, and the transverse bracket is provided with the second electrical connector; the transverse bracket is located under the vehicle beams, and the longitudinal bracket is connected to a side surface of the vehicle beams; and/or, the transverse bracket covers at least a partial area of an end of the battery unit.

13. The electric vehicle according to claim 1, wherein, the connecting unit is connected to the vehicle beams by means of a connecting bracket, and the connecting bracket is provided with a connecting groove penetrating through along the width direction of the vehicle beams, to contain, lock and fix the connecting unit.

14. The electric vehicle according to claim 1, wherein, an upper surface of the connecting unit is not higher than the upper surface of the battery packs.

15. The electric vehicle according to claim 1, wherein, the locking unit comprises a second locking containing cavity for the connecting unit entering so as to lock and fix the battery unit, and the second locking containing cavity is located on one side of a side surface of the vehicle beams;

the locking unit comprises a second locking base, and the second locking containing cavity is arranged in the second locking base, and the second locking base is connected to the vehicle beams;

or, the locking unit comprises a second locking containing cavity for the connecting unit entering so as to lock and fix the battery unit, and the second locking containing cavity is located on one side of a side surface of the vehicle beams; the locking unit comprises a second locking base, and the second locking containing cavity is arranged in the second locking base, and the second locking base is connected to the vehicle beams; the locking unit comprises a second mounting base, and the second locking base is connected to the side surface of the vehicle beams by means of the second mounting base; or, the second locking base is connected to the vehicle beams by means of a second quick-swapping bracket, and the second quick-swapping bracket is connected to the side surface of the vehicle beams.

16. The electric vehicle according to claim 15, wherein, the connecting unit comprises a second locking shaft and a second shaft base, and one end of the second locking shaft is connected to a side surface of the second shaft base and extends from the side surface of the second shaft base along a direction toward the vehicle beams; and the vehicle beams are provided with a second locking base, comprising a second locking groove, and the second locking groove is used for containing the second locking shaft;

or, the connecting unit comprises a second locking shaft and a second shaft base, and one end of the second locking shaft is connected to a side surface of the second shaft base and extends from the side surface of the second shaft base along a direction toward the vehicle beams; and the vehicle beams are provided with a second locking base, comprising a second locking groove, and the second locking groove is used for containing the second locking shaft; a plurality of second locking shafts and a plurality of second locking bases are all arranged along the length direction of the vehicle beams.

17. The electric vehicle according to claim 1, wherein, the connecting unit comprises at least one of a thread connecting piece and a T-shaped hooking piece, and the thread connecting piece is used for connecting the battery unit to the vehicle beams in a thread way, and the T-shaped hooking piece is used for rotationally clamping the battery unit to the vehicle beams.

18. The electric vehicle according to claim 1, wherein, the battery unit comprises a side battery pack, and the battery pack is arranged outside the vehicle beams;

or, the battery unit comprises a side battery pack, and the battery pack is arranged outside the vehicle beams; the battery unit further comprises a central battery pack, and the central battery pack is arranged between two side battery packs and located under the vehicle beams; and/or, the side battery pack is provided with an avoidance opening for avoiding a transmission shaft of the electric vehicle.

19. A quick-swapping assembly, wherein, the quick-swapping assembly is applied to the electric vehicle according to claim 1;

the quick-swapping assembly comprises the locking unit and the battery unit, and the locking unit is used for connecting to the vehicle beams, and the battery unit comprises the plurality of battery packs, and the connecting unit is arranged between the two adjacent battery packs corresponding to the vehicle beams, and the connecting unit is matched with the locking unit.

* * * * *